United States Patent [19]
Yumiki et al.

[11] Patent Number: 5,481,361
[45] Date of Patent: Jan. 2, 1996

[54] METHOD OF AND DEVICE FOR MEASURING POSITION COORDINATES

[75] Inventors: Naoto Yumiki, Hirakata; Hironori Honsho, Neyagawa, both of Japan

[73] Assignee: Matsushita Electric Industrial Co., Ltd., Osaka, Japan

[21] Appl. No.: 243,367

[22] Filed: May 16, 1994

[30] Foreign Application Priority Data

May 19, 1993 [JP] Japan .................. 5-116981
Jul. 3, 1993 [JP] Japan .................. 5-189976

[51] Int. Cl.⁶ .................................. G01B 11/10
[52] U.S. Cl. .................. 356/375; 356/387; 356/386
[58] Field of Search .................. 356/375, 376, 356/384–387; 250/560, 561

[56] References Cited

U.S. PATENT DOCUMENTS

| | | | |
|---|---|---|---|
| 3,870,890 | 3/1975 | Binks et al. | 356/387 |
| 4,395,119 | 7/1983 | Nakata et al. | 356/385 |
| 4,444,457 | 4/1984 | Studer | 356/387 |
| 4,648,718 | 3/1987 | Sadamitsu et al. | 356/387 |
| 4,778,271 | 10/1988 | Kuwabara et al. | 356/386 |
| 4,849,643 | 7/1989 | Mundy | 356/376 |
| 4,871,910 | 10/1989 | Ueno et al. | 356/386 |
| 4,906,098 | 3/1990 | Thomas et al. | 356/386 |
| 5,008,555 | 4/1991 | Mundy | 356/376 |
| 5,311,291 | 5/1994 | Cholet | 356/386 |
| 5,383,022 | 1/1995 | Käser | 356/387 |

FOREIGN PATENT DOCUMENTS

| | | |
|---|---|---|
| 0039143 | 11/1981 | European Pat. Off. . |
| 0266525 | 5/1988 | European Pat. Off. . |
| 2519138 | 12/1981 | France . |
| 2620818 | 3/1989 | France . |

*Primary Examiner*—Hoa Q. Pham
*Attorney, Agent, or Firm*—Sandler, Greenblum & Bernstein

[57] ABSTRACT

Two or three-dimensional position coordinates of a plurality of objects are measured without contact by installing at least one set of light emitting and receiving optical systems on opposite sides of the plurality of objects. During measurement, the light emitting optical system emits a laser beam towards the plurality of objects from a plurality of different directions, and light boundaries generated by the plurality of objects are detected by the light receiving optical system. A computer and a processor are provided to compute two or three-dimensional position coordinates of and distances between centers of the plurality of objects from outputs of the light receiving optical system. Where three-dimensional position coordinates of the plurality of objects are required, one of the object and the light emitting and receiving optical systems is moved vertically relative to the other.

10 Claims, 20 Drawing Sheets

METHOD OF AND DEVICE FOR MEASURING POSITION COORDINATES

BACKGROUND OF THE INVENTION

1. Field of the Invention

The present invention relates to a method of and a device for measuring in two or three dimensions and without contact the position accuracy of mechanical components after assembly such as, for example, mechanisms of drums, posts and the like of video tape recorders (hereafter abbreviated as VTRs).

2. Description of Related Art

In recent years, in VTRs, efforts have been made to improve the accuracy of mechanisms for high-density recording. Also, in order to achieve compatibility between systems, the technology for the high-accuracy measurement of the position of components becomes important to minimize variations between decks.

Explained below is a conventional method of measuring the position accuracy of components related to VTRs after assembly.

First, the mechanism of a VTR to be measured will be explained. A rotary drum performs recording or playback by means of a magnetic rotary head mounted at the bottom end thereof, with a magnetic tape, supplied from a cassette, wound diagonally around the rotary drum. The magnetic tape is not to be run during the measurement. A stationary drum has a stepped or shoulder portion known as a lead which regulates the bottom edge of the magnetic tape. The rotary drum and the stationary drum constitute a drum unit. A roller post positioned upstream of the drum unit with respect to the direction of motion of the magnetic tape stands vertically and regulates the upper-edge of the magnetic tape in motion, and an inclined post changes the direction of motion of the magnetic tape. These posts are hereinafter referred to as upstream posts. An inclined post positioned downstream of the drum unit with respect to the direction of motion of the magnetic tape restores the motion of the magnetic tape to its original direction, and a roller post stands vertically and regulates the upper edge of the magnetic tape. These posts are hereinafter referred to as downstream posts. Thus, the measurement object (object to be measured) in this example comprises the drum unit, roller posts, and inclined posts, all of which are regarded as the main components of the VTR mechanism.

Next, a conventional, contact-type device for measuring position coordinates will be explained. First, a measurement object is set on a reference plane of a measurement platform. A probe which is affixed to the contact-type device for measuring position coordinates is capable of moving in X, Y and Z directions. Also, each of the X, Y and Z coordinates is detected by a position coordinate detection device. A computation device computes the position coordinates in X, Y and Z directions from the values that have been detected by the position coordinate detection device, and computes the angle of inclination and the direction of inclination of the measurement object and the distance between the centers of the posts.

With regard to the conventional contact-type position coordinate measurement device configured in the above manner, its measurement method will be explained below.

First, the method of measuring the upstream inclined post will be explained. Set the reference directions, X and Y, and set, for instance, the center of the moving magnetic tape as the reference height of the mechanism. Next, at an arbitrary height, let the probe contact the outer periphery of the inclined post at a minimum of 3 points, find the X, Y coordinates, and from those values find the center of the post. Similarly, take measurements at a different height, and find the center of the post. In effect, by taking measurements at arbitrary heights at a minimum of two places, a center line connecting the coordinates of the centers of the inclined post can be found. Similarly, a center line of the upstream roller post can be found.

In this way, all of the inclination angles, inclination directions and x, y coordinates at arbitrary heights of the inclined posts, and the distance between the centers of the posts at the reference height can be found by computation with the computation device.

However, as explained below, there are problems with the aforementioned conventional setup:

(1) Since the rotary drum is a rotating body, it is difficult to bring the probe into contact therewith when the rotary drum is rotating. Accordingly, no measurement can be made during rotation and, hence, no measurement can be made of the relative position between the drum unit and other posts, which is the most important measurement.

(2) Since the inclined post is inclined at an angle, the probe can be brought into contact with only a limited portion thereof in obtaining the center thereof. Hence, errors are likely to occur when the center of the circle is obtained. Furthermore, the larger the angle of inclination, the larger this trend becomes. Also, the distance between the inclined post and the roller post is very narrow, and is expected to become even narrower as miniaturization of the mechanism continues further in the future, so that the measurement portion will be further restricted.

(3) A post that is small in diameter and low in stiffness will change its shape when a load is applied due to probe contact, and therefore accurate measurement cannot be made.

(4) Contact-type measurement cannot be made when a magnetic tape is wound around the measurement object. However, when recording or playback is actually done, a force is applied to the measurement object, since the magnetic tape is wound therearound with a constant tension. Hence, delicate differences will occur in measurements of assembling accuracy of the mechanism depending on whether the magnetic tape is present or not.

(5) The device is large in size.

Therefore, it was not considered to be a method which would enable accurate measurement of the positions of the components of the assembled mechanism.

SUMMARY OF THE INVENTION

The present invention has been developed to overcome the above-described disadvantages.

It is accordingly an objective of the present invention to provide a method of and a device for measuring without contact two-dimensional or three-dimensional position coordinates of the components of a mechanism after assembly.

In accomplishing the above and other objectives, an object to be measured is placed on a plane, and a laser beam having a predetermined diameter and scanning parallel to the plane is irradiated on the object from a plurality of different directions. Then, a plurality of different projected position coordinates of the object are computed from two tangent points of a cross section which is generated when the object is cut with the laser beam. The two-dimensional position coordinates of the object are computed from the different projected position coordinates and the angular difference between the different directions.

To this end, the position coordinate measurement device according to the present invention comprises a light emitting optical system for emitting a laser beam having a predetermined diameter and scanning parallel to the plane, a light receiving optical system having a photodetector for detecting the laser beam, and a rotating means for rotating one of the object and the light emitting and receiving optical systems relative to each other to thereby change the angle by which the laser beam is irradiated on the object. The angle of rotation of said one of the object and the light emitting and receiving optical systems is detected by a rotational angle detection means. A computation means is provided for determining a plurality of different projected position coordinates of the object from outputs of the photodetector obtained by irradiating the laser beam from a plurality of different directions. A computation processing means determines two-dimensional position coordinates of the object from the different projection position coordinates of the object and the angle of rotation.

By the above-described construction, the two-dimensional position coordinates of, for example, assembled components can be measured at high accuracy and high speed without contact regardless of the attitude or size thereof.

Preferably, the object is in contact with a transparent tape, which allows the laser beam to transmit therethrough, and a tension is applied to the tape by a tension device.

By so doing, the two-dimensional position coordinates can be measured in a condition in which the tension is applied to the tape.

Also, preferably, the tape is moved relative to the object by a tape drive means. In this case, the two-dimensional position coordinates of the assembled components can be measured in a condition in which the tape is running, i.e., the condition unlimitedly close to the actual recording or playback mode.

The position coordinate measurement device may comprise plural sets of light emitting and receiving optical systems disposed on opposite sides of the object. The plural sets of light emitting and receiving optical systems are spaced a predetermined angle from each other.

In this case, the rotating means and the rotational angle detection means are not required. The computation means determines the different projected position coordinates of the object from outputs of photodetectors of the plural sets of light emitting and receiving optical systems, and the computation processing means determines the two-dimensional position coordinates of the object from the different projected position coordinates of the object and the angular difference in the position of the plural sets of light emitting and receiving optical systems.

In another aspect of the present invention, the laser beam is irradiated on the object from a plurality of different directions while the laser beam is being moved in a direction generally perpendicular to the plane. In this case, three-dimensional position coordinates of the object are computed from the different projected position coordinates, the angular difference between the different directions, and the length of movement of the laser beam.

To this end, the position coordinate measurement device comprises a light emitting optical system for emitting a laser beam having a predetermined diameter and scanning parallel to the plane, a light receiving optical system having a photodetector for detecting the laser beam, a drive means for moving one of the object and the light emitting and receiving optical systems relative to each other so that the object is irradiated with the laser beam at a plurality of heights, and a movement detection means for detecting the length of movement of said one of the object and the light emitting and receiving optical systems. The position coordinate measurement device also comprises the rotating means, rotational angle detection means, and computation means as mentions above. The computation processing means determines three-dimensional position coordinates of the object from the different projection position coordinates of the object, the angle of rotation, and the length of movement of said one of said object and said light emitting and receiving optical systems.

As mentioned previously, the position coordinate measurement device may include the transparent tape, tension device, and tape drive means. In this case, the three-dimensional position coordinates of the assembled components can be measured in a condition unlimitedly close to the actual recording or playback mode. Also, it becomes possible at the same time to check the running conditions of the tape such as changes in a direction widthwise of the tape, thereby greatly contributing to the examination of the mechanisms for stable operation of the tape.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

A position coordinate measurement device of the present invention for finding two- or three-dimensional position coordinates will be discussed hereinafter with reference to the drawings.

Figure 1:
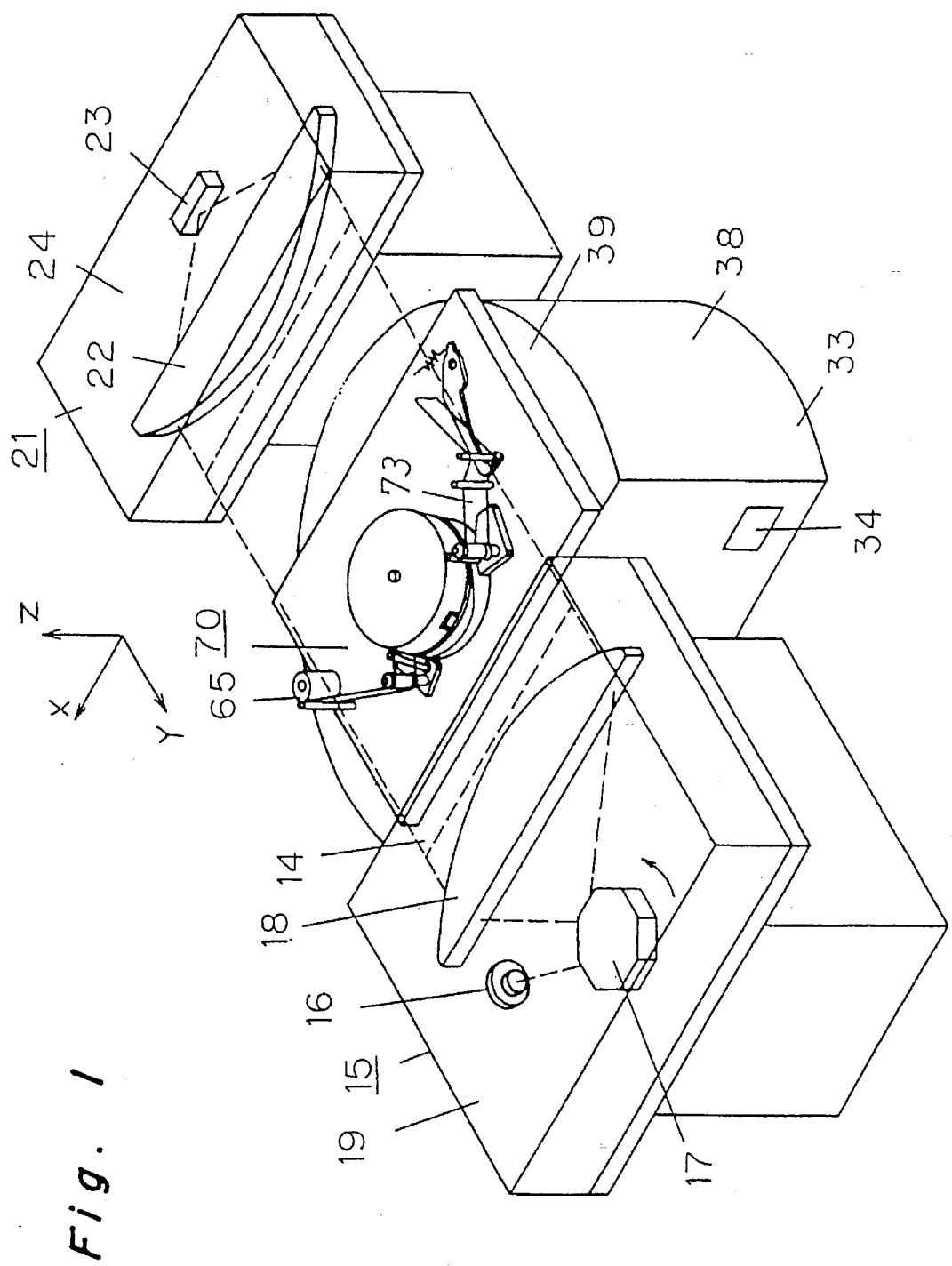
FIG. 1 is a perspective view of a position coordinate measurement device according to a first embodiment of the present invention.

FIG. 1 depicts a position coordinate measurement device according to a first embodiment of the present invention.

In FIG. 1, a measurement object 70 is installed or placed on an installation plane 39 of a measurement platform 38 having a rotary stage 33. A light emitting optical system 15 and a light receiving optical system 21 are disposed on opposite sides of the measurement platform 38. The light emitting optical system 15 comprises a scanning mirror 17 such as a polygon mirror to scan a laser beam 14, an fθ lens 18 for focusing the laser beam 14 that has been scanned by the scanning mirror 17 to a predetermined beam diameter, and also for scanning the laser beam parallel to the installation plane 39, and a cover 19. The light receiving optical system 21 comprises a focusing lens 22 for focusing part of the laser beam 14 that is not intercepted by the measurement object 70, a photodetector 23 placed at a focal point of the focusing lens 22 to output High and Low signals alternately in response to the brightness and darkness of the light, and a cover 24. The rotary stage 33 rotates the measurement object 70 about the Z axis, and a rotational angle detection device 34, a photoelectric rotary encoder for example, detects the rotational angle (γ).

Figure 2:
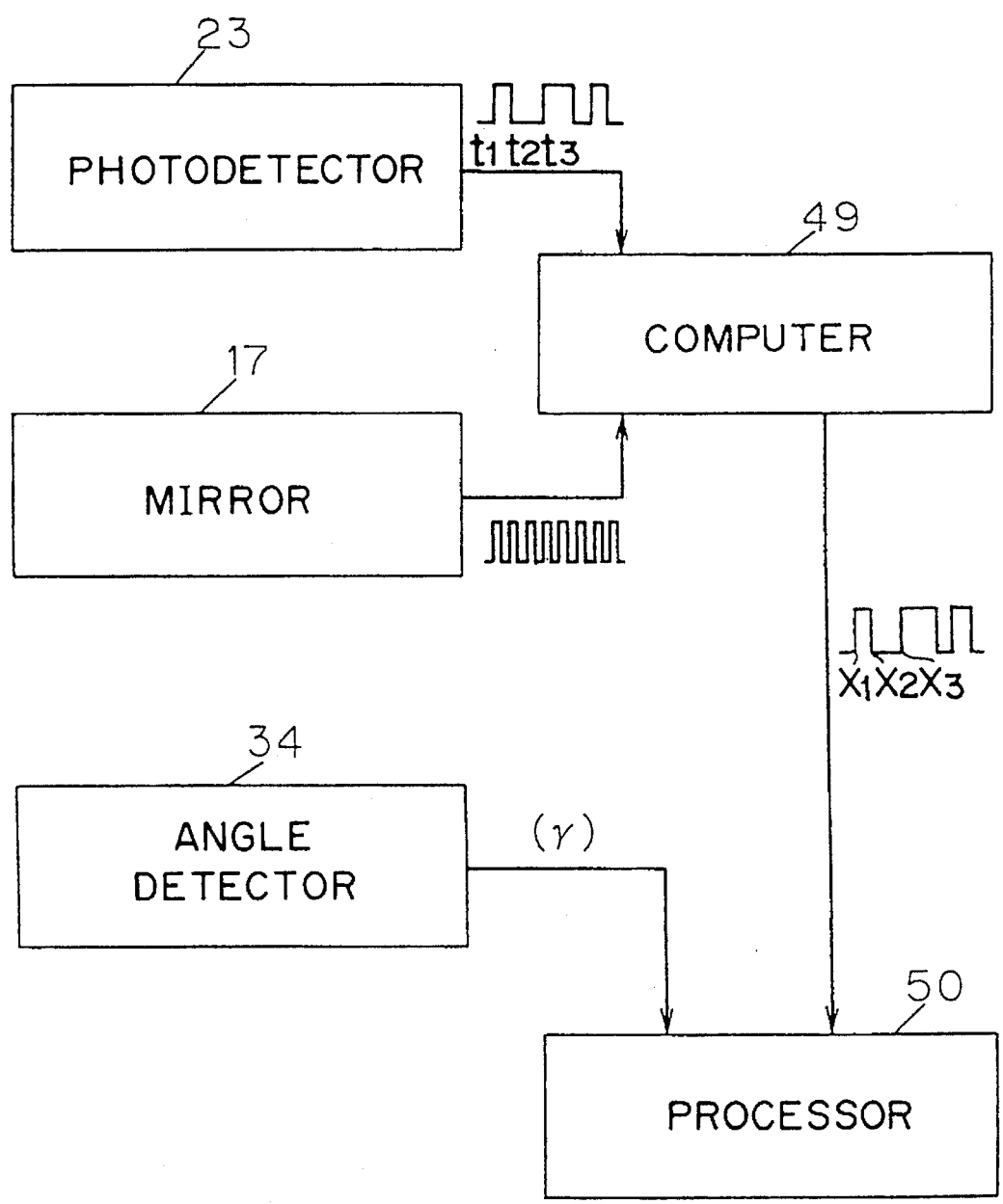
FIG. 2 is a schematic block diagram indicating the system construction of FIG. 1.
Figure 6:
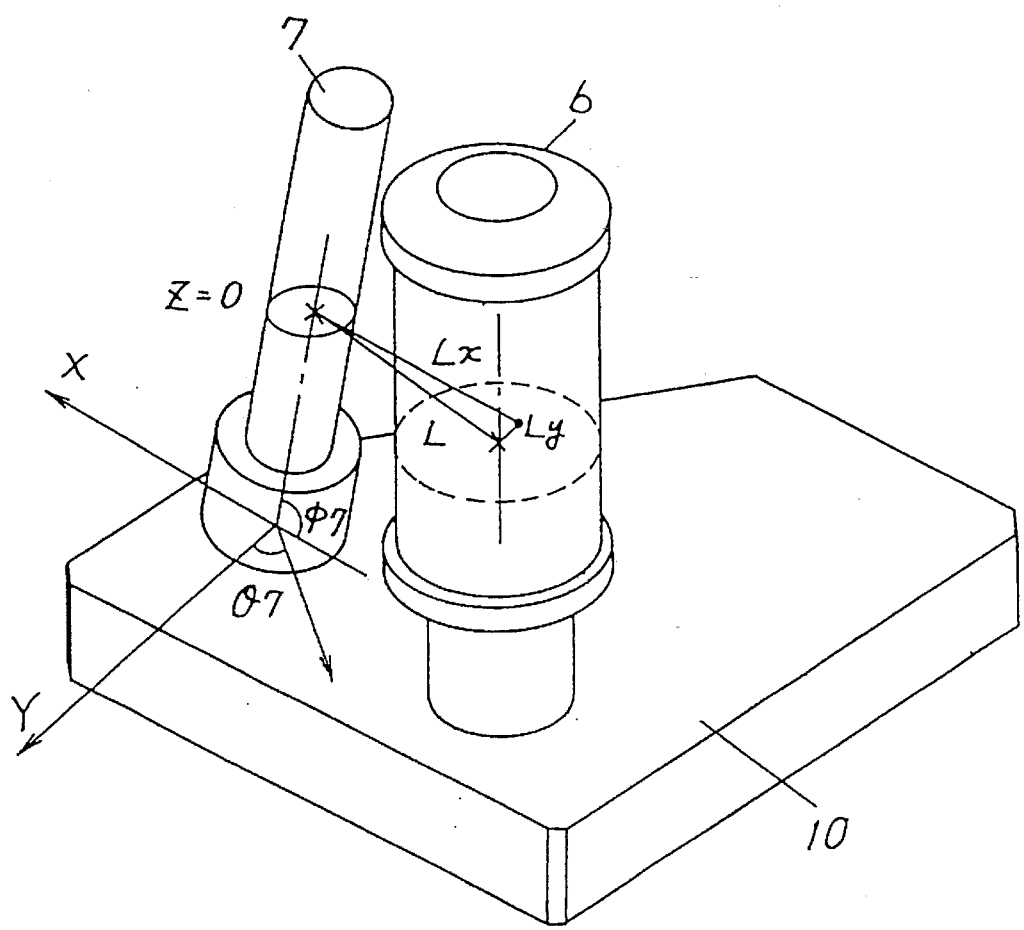
FIG. 6 is a view similar to FIG. 5, but indicating the relative positional relationship between the two posts.

In FIG. 2, a computation device 49 compares the time t (t1, t2, t3, . . . ) at which the photodetector 23 outputs alternate signals of High and Low with a pulse signal generated in synchronism with the rotation of the scanning mirror 17, and converts the results to X-projected position coordinates (x1, x2, x3, . . . ). A computation processing device 50 computes the center distance (L) of the measurement object 70 shown in FIG. 6, based on the rotational angle (γ) and the X-projected position coordinates (x1, x2, x3, . . . ).

Next, the measurement object 70 will be discussed with reference to FIG. 3 indicating mechanical components of a VTR.

As is well known to those skilled in the art, the VTR generally includes a plurality of posts disposed upstream and downstream of a drum unit with respect to the direction of motion of a magnetic tape. Hence, for the purpose of discussion of various preferred embodiments of the present invention, the measurement object 70 is described as having upstream posts and downstream posts, these terms "upstream" and "downstream" being used in relation to the direction of motion of the magnetic tape.

Figure 3:
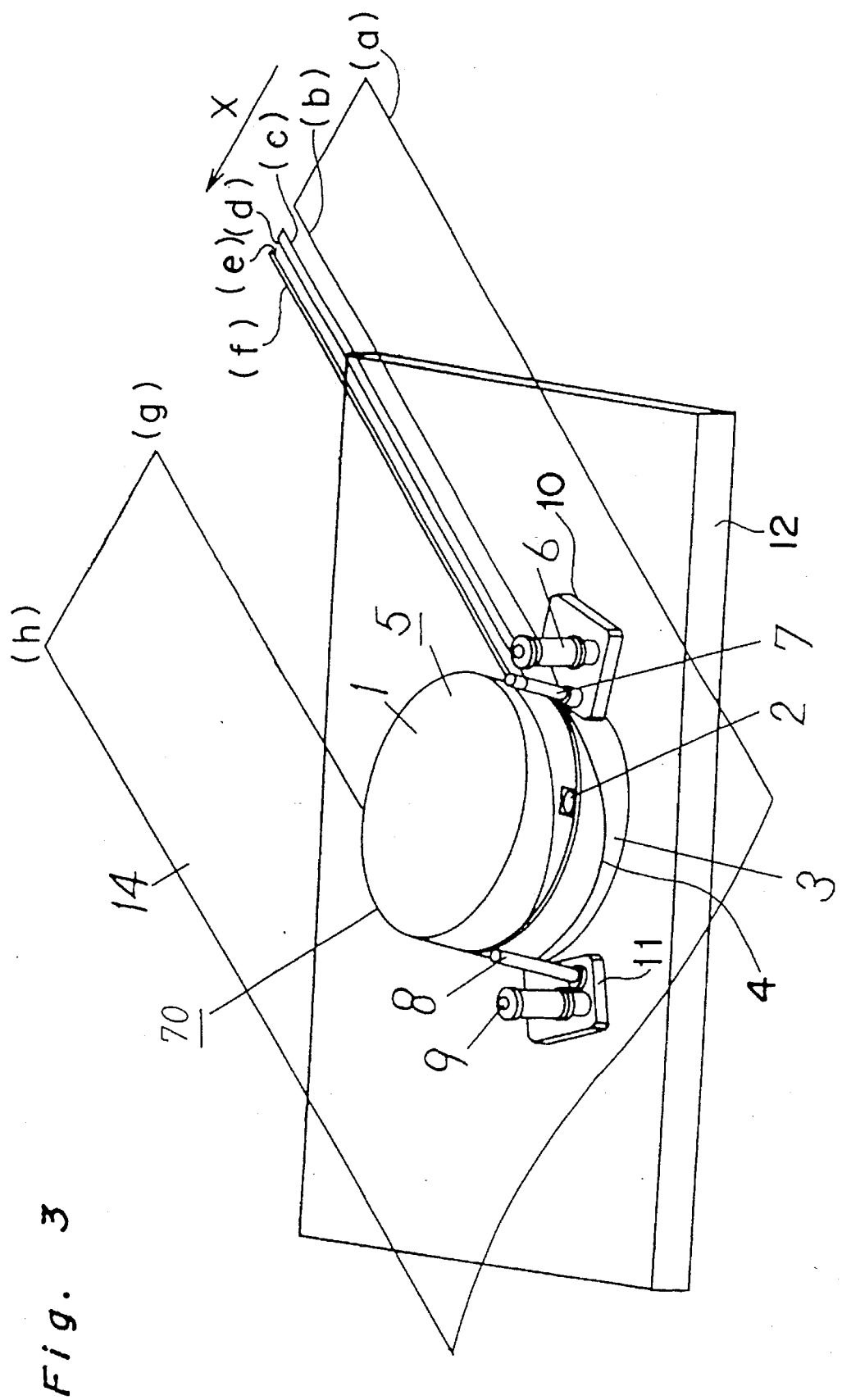
FIG. 3 is a perspective view of an object to be measured during measurement.

In FIG. 3, a rotary drum 1 performs recording or playback by means of a magnetic head 2 mounted on the bottom end thereof, in a condition in which a magnetic tape supplied from a cassette (not shown) is wound diagonally around the rotary drum 1. It is, however, to be noted that the magnetic tape is not to be run during actual measurement. A stationary drum 3 has a lead 4 which regulates the lower edge of the magnetic tape. The rotary drum 1 and stationary drum 3 constitute a drum unit 5. An upstream roller post 6, which stands vertically, regulates the upper edge of the magnetic tape in motion, and an inclined post 7 changes the direction of motion of the magnetic tape. A downstream inclined post 8 restores the motion of magnetic tape 13 to its original direction, and a roller post 9, which stands vertically, regulates the upper edge of the magnetic tape. Thus, the measurement object 70 in this preferred embodiment comprises elements 1 through 9 which are the principal parts of the VTR mechanism. The roller post 6 and inclined post 7 are retained by an upstream base 10, while the roller post 8 and inclined post 9 are retained by a downstream base 11. These bases 10 and 11 are mounted on a chassis 12 along with the drum unit 5.

The two-dimensional position coordinate measurement device configured as described above is discussed hereinafter, taking a measurement method for the upstream roller post 6, inclined post 7 and drum unit 5 as example.

In FIG. 3, the measurement platform 38 is rotated by means of the rotary stage 33 so that the upstream roller post 6, inclined post 7 and drum unit 5 can be measured. At this moment, dark portions appear on the light receiving side if the laser beam 14 is intercepted by the measurement object 70, and bright portions appear if the laser beam 14 is not intercepted. As a result, light boundaries (a) through (h) are generated in the X-axis direction. Of these light boundaries (a) through (h), (b) and (c) indicate the boundaries for the roller post 6, while (d) and (e) indicate the boundaries for the inclined post 7.

Figure 4:
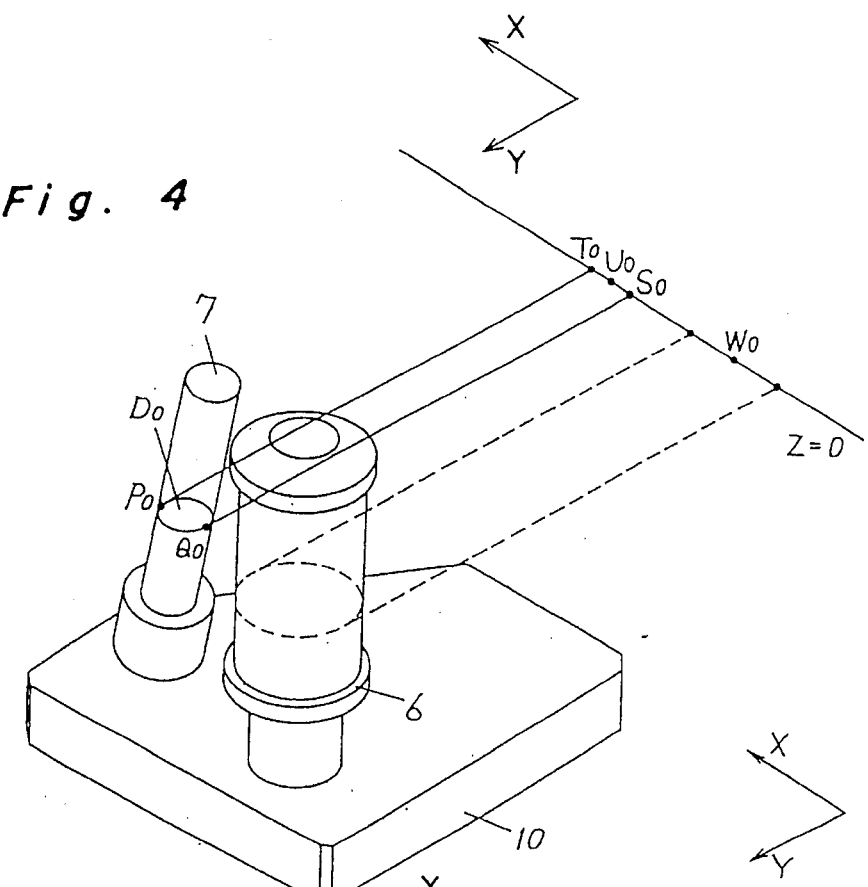
FIG. 4 is a perspective view of a roller post and an inclined post of the object of FIG. 3.
Figure 5:
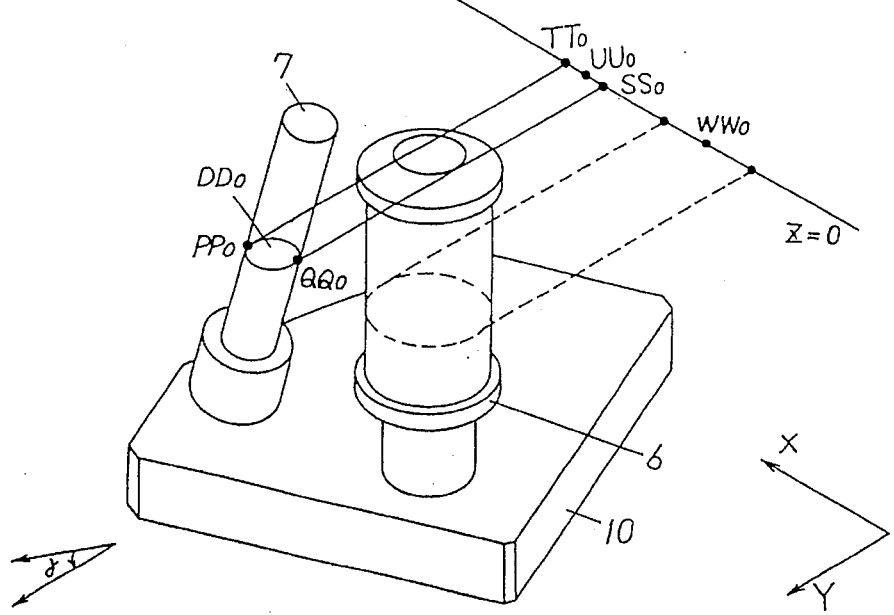
FIG. 5 is a view similar to FIG. 4, but indicating the two posts when the object of FIG. 3 is rotated.

More specifically, the laser beam 14 is irradiated on the upstream roller post 6 and inclined post 7 at the reference height (Z=0) shown in FIG. 4. With respect to the inclined post 7, the first X-projected position coordinates (S0, T0), which are the light boundaries (d) and (e) in the X-axis direction as explained above, are computed with the computation device 49 from both tangent points P0 and Q0 of a cross-sectional circle D0, which is generated when the inclined post 7 is cut by the laser beam 14. Next, in FIG. 5 wherein the measurement platform 38 is rotated by means of the rotary stage 33 by an angle of (γ) from the state of FIG. 4, the laser beam 14 is irradiated on the inclined post 7 and roller post 6 from an angle differing by the angle of (γ). Then, from both tangent points PP0 and QQ0 of the cross-sectional circle, which is generated when the inclined post 7 is cut by the laser beam 14, the second X-projected position coordinates (SS0, TT0) are found with the computation device 49. Then, from the first X-projected position coordinates (S0, T0) and the second X-projected position coordinates (SS0, TT0), the X-projected position coordinates (U0, UU0) of the center of the inclined post 7 as seen from both the directions are calculated in approximation with the computation processing device 50. Similarly, the X-projected position coordinates (W0, WW0) of the center of the roller post 6 as seen from both the directions can also be found. Hence, in FIG. 6, the center distance (L) at the reference height (Z=0) between the upstream inclined post 7 and roller post 6 can be found from the X-direction distance (Lx), Y-direction distance (Ly) and the difference in rotational angle (γ) using Formula 1 represented by:

$$L = \sqrt{Lx^2 + Ly^2}$$

where Lx=U0−W0 and Ly={(U0−W0)−(UU0−WW0)/cosγ}/tanγ.

Similarly, the center distance (L) between the roller post 6 and drum unit 5 or between the inclined post 7 and drum unit 5 can be found. Also, the drum unit 5, the downstream inclined post 8 and roller post 9 can be measured by rotating them until profile lines thereof are detected by the light receiving optical system.

As described above, according to this preferred embodiment, a non-contact measurement of all center distances (Ls) is possible at an arbitrary height for the upstream roller post 6, inclined post 7, drum unit 5, downstream inclined post 8 and roller post 9.

Note that in this embodiment, an explanation was given concerning the method of and the device for finding the two-dimensional position coordinates from two sets of different X-projected position coordinates obtained by rotating the measurement object, but conversely, measurement can be made similarly by rotating the light emitting optical system and light receiving optical system relative to the measurement object. Furthermore, in this embodiment, an explanation was given concerning the case of irradiating the laser beam from two different directions, but since the two-dimensional position coordinates can be determined by obtaining at least two sets of different X-projected position coordinates, measurement can be made from three or more directions, and in that case, the measurement accuracy would improve further.

Figure 7:
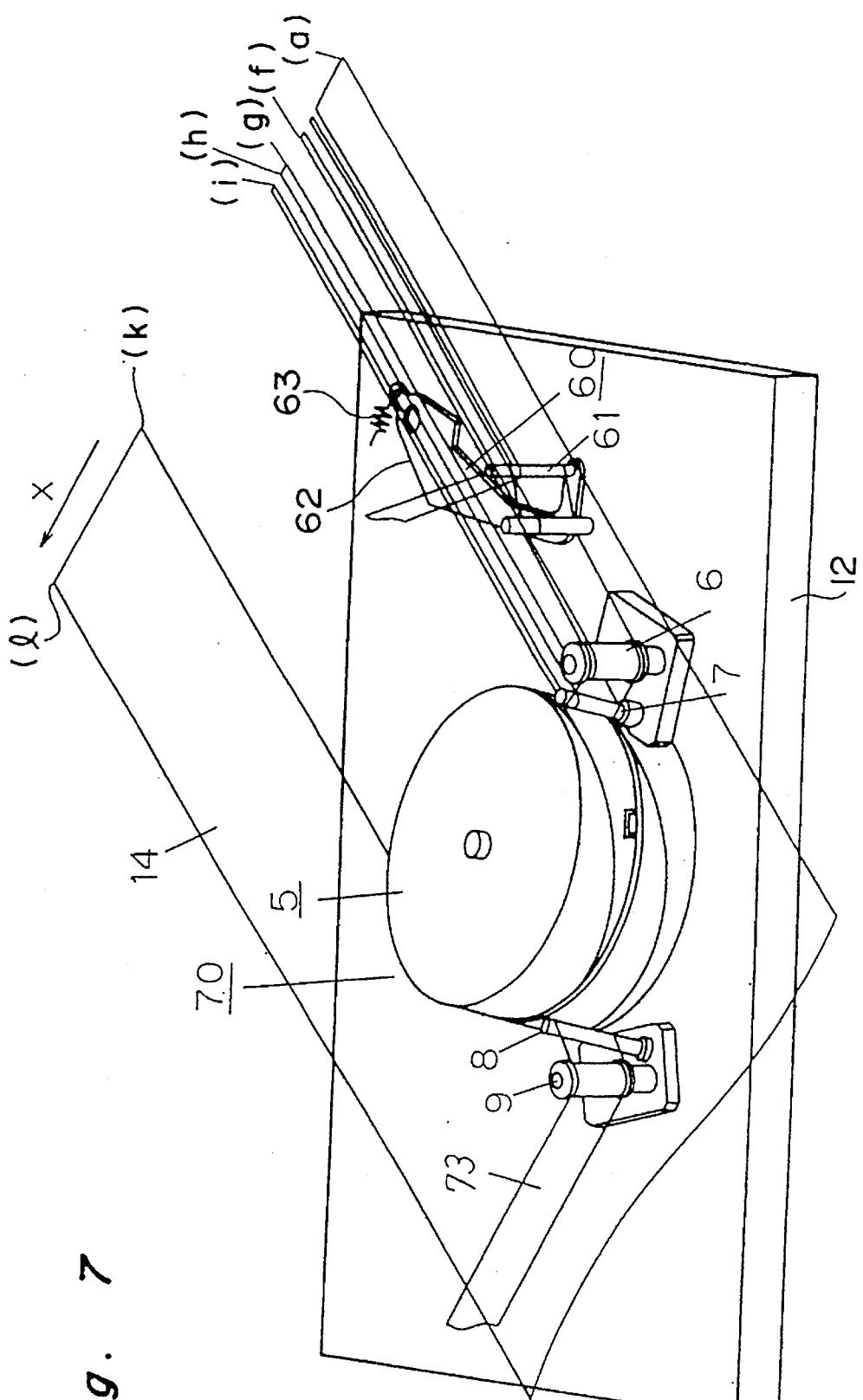
FIG. 7 is a perspective view of the object of FIG. 3 when measured by the position coordinate measurement device having a tension device.

As shown in FIG. 7, a tension device 60 may be mounted on the chassis 12 to provide a tape 73 with a constant tension. The tension device 60 comprises a tension post 61 which makes contact with the tape 73, a base 62 for retaining the tension post 61, and a spring 63 having one end connected to the chassis 12 and the other end connected to the base 62. In this case, the measurement object 70 comprises the principal components 1 through 9 of the VTR mechanism and the tension device 60. The tape 73, wound around the measurement object 70 with a fixed angle, is a transparent tape such as, for example, a base film on which no magnetic substance is coated so that it transmits the laser beam 14 therethrough and has approximately the equivalent properties of, e.g., thickness and stiffness, with those of the magnetic tape for use in recording signals.

The two-dimensional position coordinate measurement device configured as described above is discussed hereinafter, taking a measurement method for the upstream roller post 6, inclined post 7 and drum unit 5 as example.

The tape 73 is first wound around individual components of the measurement object 70, and a constant tension is applied thereto by means of the tension device 60. Next, the measurement platform 38 is rotated by means of the rotary stage 33 so that the upstream roller post 6, inclined post 7 and drum unit 5 can be measured. Since on the light receiving side the portions where the laser beam 14 is intercepted by the measurement object 70 become dark, and other portions with no interception become bright, light boundaries (a) through (l) are generated in the X-axis direction. Of these light boundaries (a) through (l), (f) and (g) indicate the boundaries for the roller post 6, while (h) and (i) indicate the boundaries for the inclined post 7. Since the tape 73 transmits the laser beam 14 therethrough, no boundary between brightness and darkness will appear due to the tape on the light receiving side.

Figure 8:
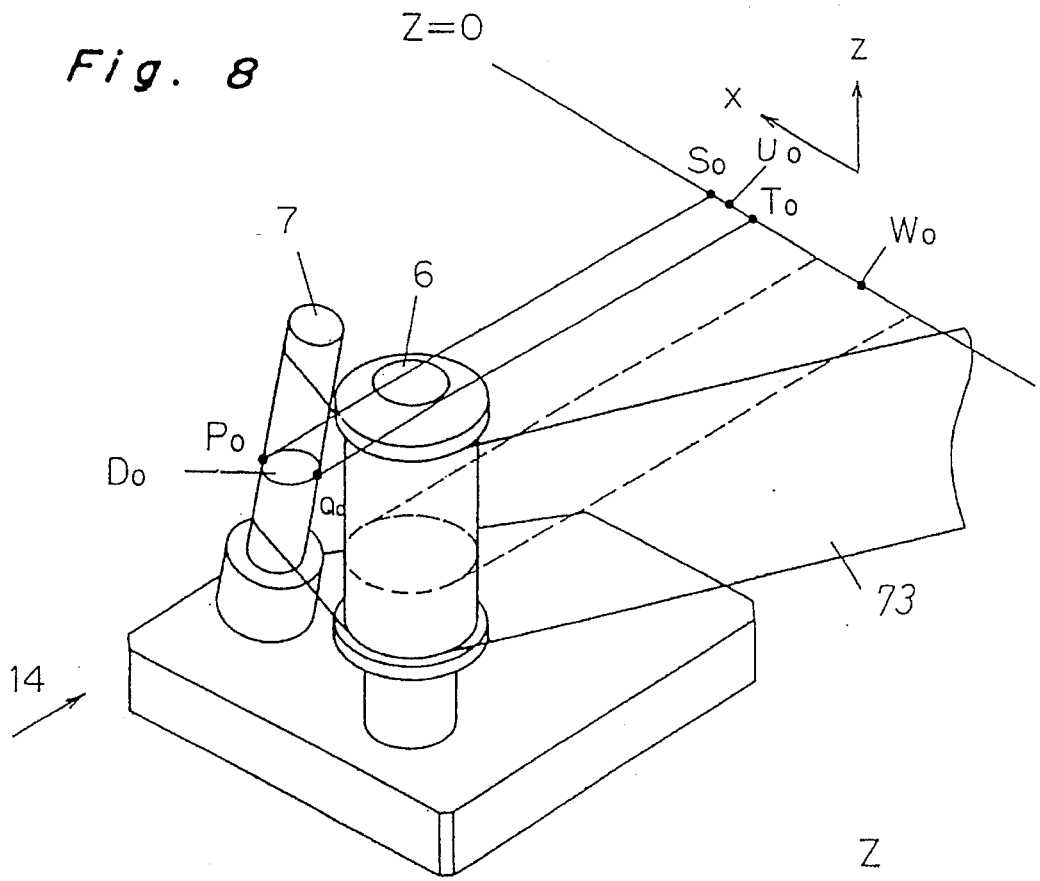
FIG. 8 is a view similar to FIG. 4, but indicating the two posts when a tension is applied thereto by the tension device through a transparent tape wound therearound.
Figure 9:
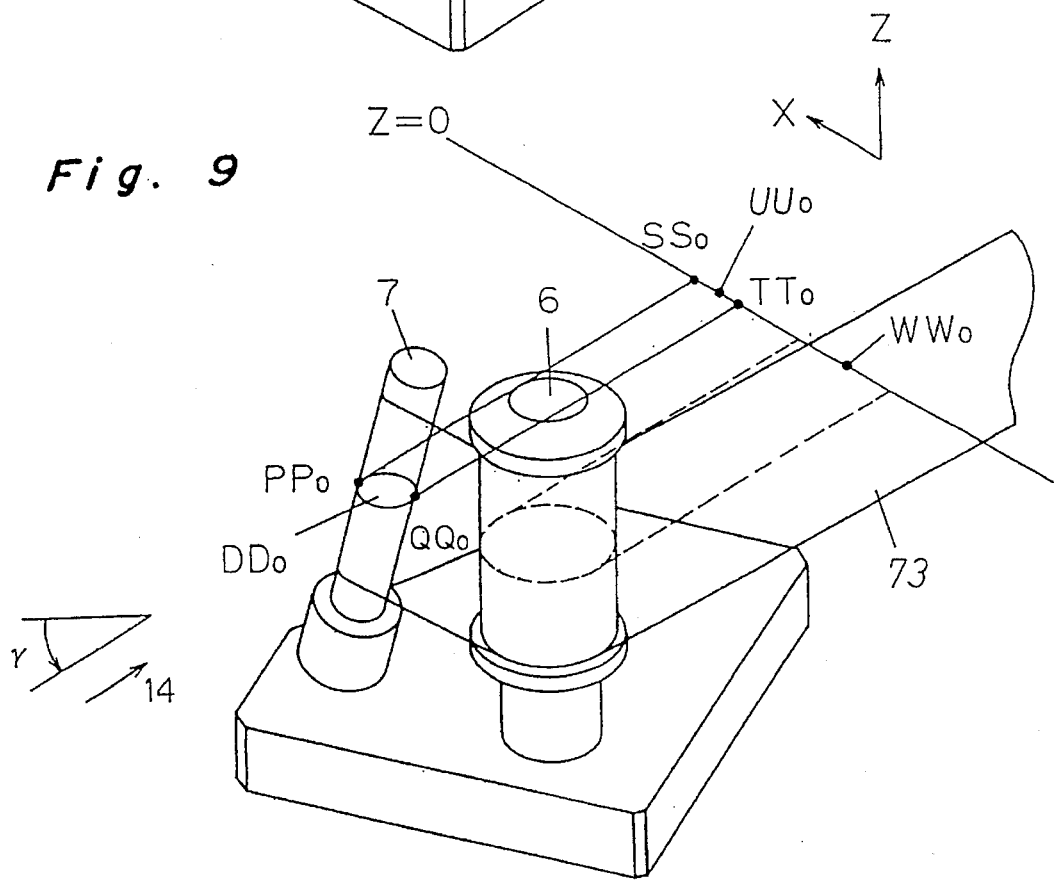
FIG. 9 is a view similar to FIG. 8, but indicating the two posts when the object is rotated.

More specifically, the upstream roller post 6 and inclined post 7 are irradiated with the laser beam 14 at the reference height (Z=0) shown in FIG. 8. With respect to the inclined post 7, the first X-projected position coordinates (S0, T0), which are the light boundaries (h) and (i) in the X-axis direction as explained above, are determined with the computation device 49 from both tangent points P0 and Q0 of the cross-sectional circle D0, which is generated when the inclined post 7 is cut with the laser beam 14. Next, in FIG. 9 wherein the measurement platform 38 is rotated by an angle of (γ) by means of the rotary stage 33 from the state of FIG. 8, the laser beam 14 is irradiated on the inclined post 7 and roller post 6. Then, from both tangent points PP0 and QQ0 of the cross-sectional circle DD0, which is generated when the inclined post 7 is cut with the laser beam 14, the second X-projected position coordinates (SS0, TT0) are found with the computation device 49. Then, from the first X-projected position coordinates (S0, T0) and the second X-projected position coordinates (SS0, TT0), the X-projected position coordinates (U0, UU0) of the center of the inclined post 7 as seen from the two directions, respectively, can be determined in approximation with the computation processing device 50. Similarly, the X-projected position coordinates (W0, WW0) of the center of the roller post 6 as seen from the two directions, respectively, can be determined. Hence in FIG. 6, the center distance (L) at the reference height (Z=0) between the upstream inclined post 7 and roller post 6 can be determined from the distance in the X direction (Lx), the distance in the Y direction (Ly) and the difference in rotational angle (γ) with the use of the Formula 1 mentioned before.

Similarly, the center distance (L) between the roller post 6 and drum unit 5 or between the tension post 61 and drum unit 5 can be determined. Also, the drum unit 5, downstream inclined post 8, and roller post 9 can be measured by rotating them until profile lines thereof are detected by the light receiving optical system.

As described above, all center distances (Ls) at an arbitrary height between the upstream roller post 6, inclined post 7, drum unit 5, downstream inclined post 8, roller post 9 and tension post 61 can be measured in a condition in which no contact is made and in which a force is added from the tape 73 that is provided with a constant tension.

Figure 10:
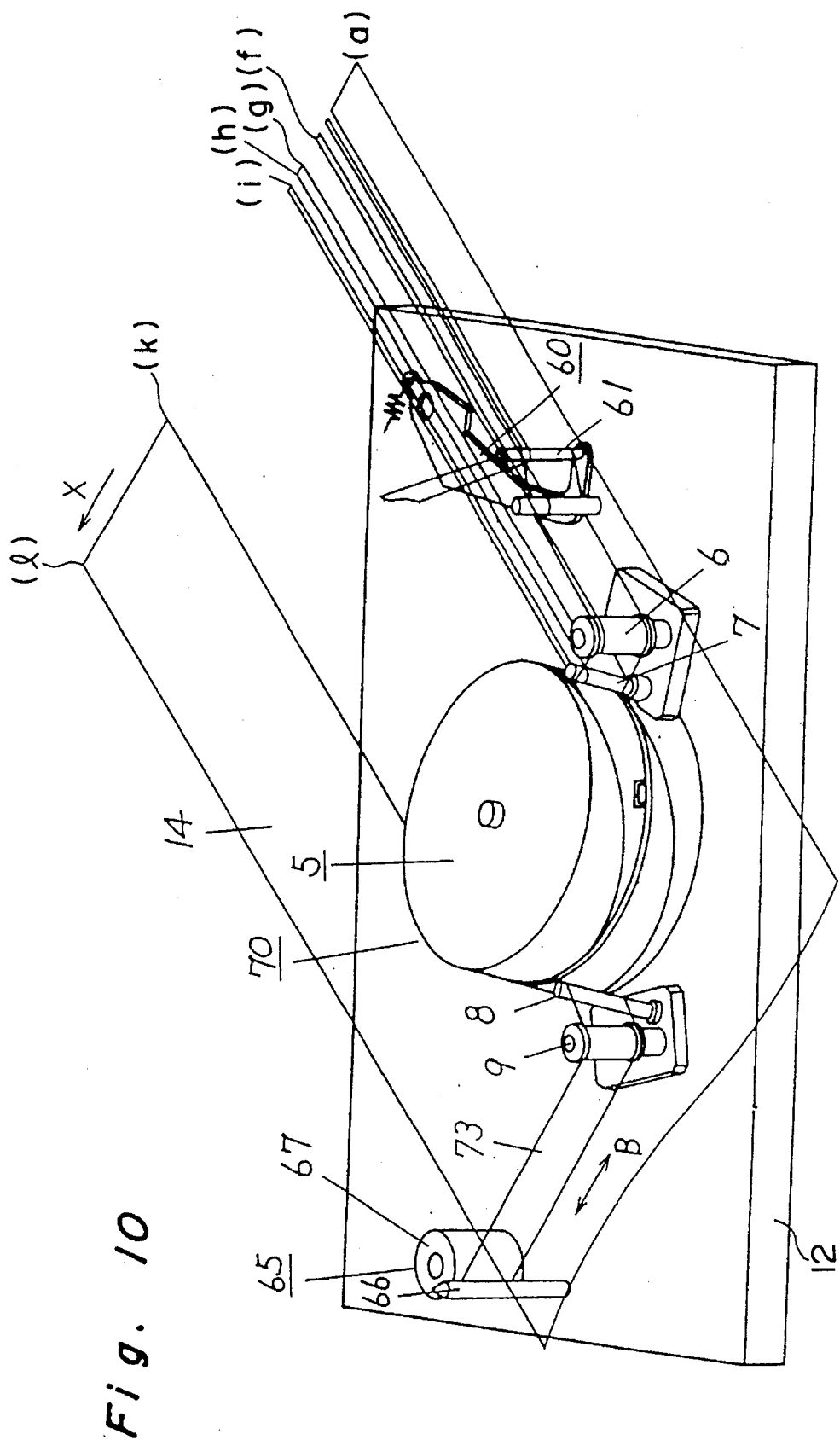
FIG. 10 is a perspective view of the object when measured by the position coordinate measurement device having a tension device and a tape drive.

As shown in FIG. 10, a tape drive 65 may be mounted on the chassis 12 to drive the tape 73 in the direction of the arrow B. The tape drive 65 comprises a post 66 and a pinch roller 67. By the tape 73 running in the direction of the arrow B while making contact with the measurement object 70, the tape tension will become higher towards the downstream side in the direction of movement of the tape 73, and the force applied to the measurement object 70 will also increase. In this case, the measurement object 70 comprises the principal components 1 through 9 of the VTR mechanism, tension device 60, and tape drive 65.

The two-dimensional position coordinate measurement device of the above-described construction operates as follows.

The tape 73 is first wound around the measurement object 70, and a constant tension is then applied thereto by means of the tension device 60. The tape 73 is run in the direction of the arrow B by means of the tape drive 65. Since the tape 73 transmits the laser beam 14 therethrough, no boundaries for brightness and darkness due to the tape will appear on the light receiving side. Since the measurement method is the same as that explained with reference to FIG. 7, its explanation will be omitted.

As described above, according to this preferred embodiment, it is possible to measure without contact all of the center distances (Ls) at an arbitrary height between the upstream roller post 6, inclined post 7, and drum unit 5, and between the downstream inclined post 8, roller post 9, and tension post 61. Moreover, measurement is possible in a condition in which the position-dependent force is exerted upon the measurement object 70 by the tape 73 which is running, i.e., in a condition unlimitedly close to the actual mode of recording or playback.

Although in the above-described embodiment the rotary stage 33 rotates the measurement object 70 about the Z axis, it may rotate the light emitting and receiving optical systems together, with the measurement object 70 maintained stationary.

Figure 11:
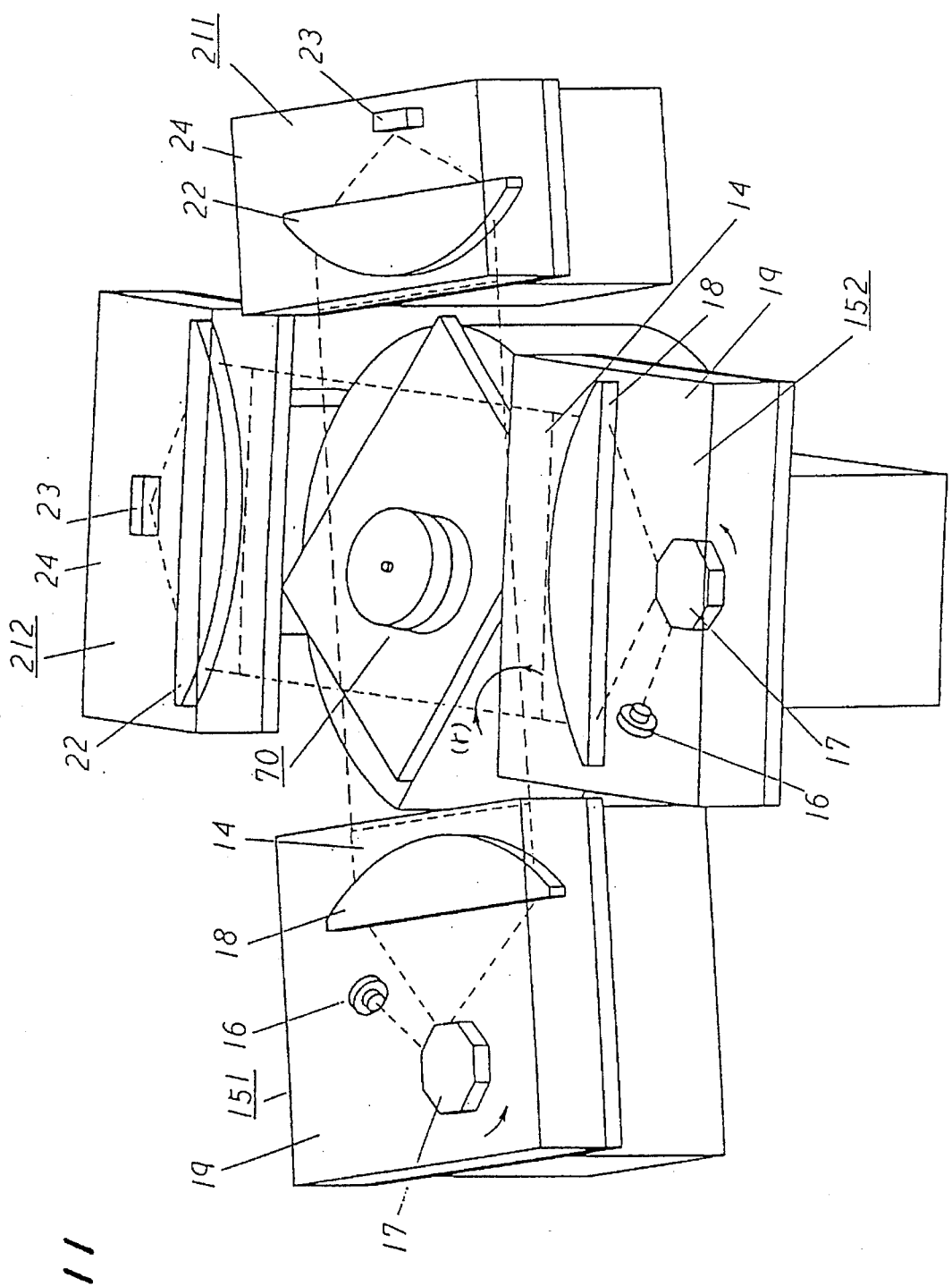
FIG. 11 is a perspective view of a position coordinate measurement device according to a second embodiment of the present invention.

FIG. 11 depicts a position coordinate measurement device according to a second embodiment of the present invention. Note that elements that have already been explained will have identical reference numerals, and their description will be omitted.

In FIG. 11, the measurement object 70 is installed between a first light emitting optical system 151 and a first light receiving optical system 211, and between a second light emitting optical system 152 and a second light receiving optical system 212. The first optical system 151 and 211 is located at a position rotated by an angle of ($\gamma$) from the second optical system 152 and 212. Laser beams are emitted alternatively from the light emitting optical systems 151 and 152. The computation processing device 50 of FIG. 2 computes the center distance (L) of the measurement object 70 shown in FIG. 6, based on the angular difference ($\gamma$) in installation position of the first and second optical systems, instead of using the rotational angle ($\gamma$) detected by the rotational angle detection device 34, and the X-projected position coordinates (x1, x2, x3, . . . ) determined respectively by the first and second optical systems.

With respect to the two-dimensional position coordinate measurement device configured as above, its measurement method will be explained.

First, the first X-projected position coordinates are determined by irradiating on the measurement object 70 a laser beam from the first light emitting optical system 151. Next, the second X-projected position coordinates are determined by irradiating a laser beam from the second light emitting optical system 152. As for the method of finding the two-dimensional position coordinates, its explanation will be omitted, since it is the same as the one explained for the first embodiment.

Also, according to the second embodiment, it is possible to measure without contact the center distances (Ls) between all posts at an arbitrary height.

Note that in the second embodiment, an explanation was given as to the method of and device for finding the two-dimensional position coordinates from two sets of different X-projected position coordinates obtained by setting two units of optical systems, but since the two-dimensional position coordinates can be determined if at least two sets of different X-projected position coordinates are obtained, it is also possible to measure with three or more units installed. In that case, the measurement accuracy will improve further.

Figure 12:
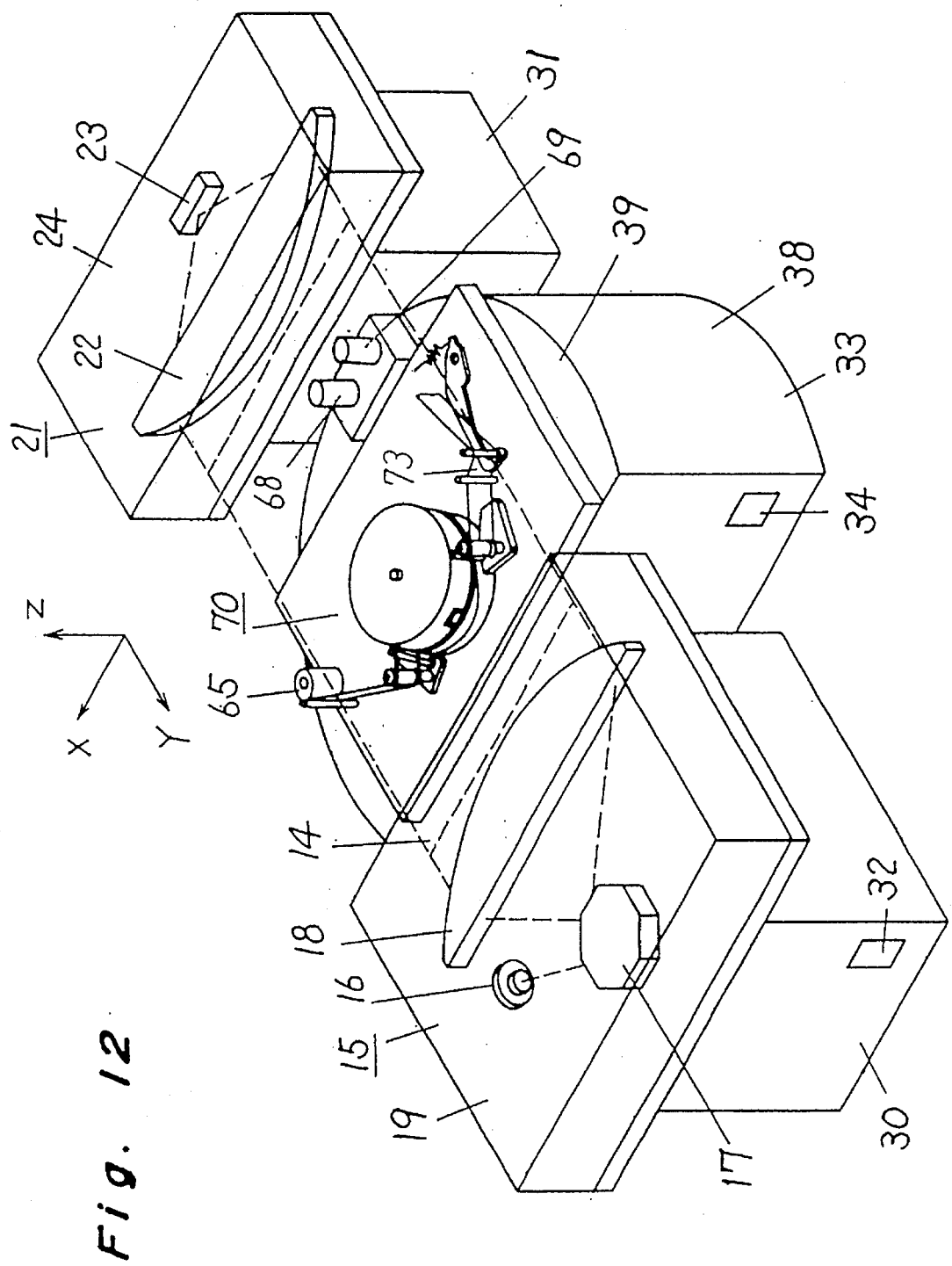
FIG. 12 is a perspective view of a position coordinate measurement device according to a third embodiment of the present invention.

FIG. 12 depicts a three-dimensional position coordinate measurement device according to a third embodiment of the present invention.

As shown in FIG. 12, the light emitting and receiving optical systems 15 and 21 are mounted on respective Z-axis stages 30 and 31 for vertical movement thereof. The Z-axis stages 30 and 31 move the light emitting and receiving optical systems 15 and 21, respectively, always by the same length in the Z-axis direction generally perpendicular to the installation plane 39. The length (H) of vertical movement of the light emitting and receiving optical systems 15 and 21 is detected by means of a Z-axis scale 32 mounted on, for example, the Z-axis stage 30.

Figure 13:
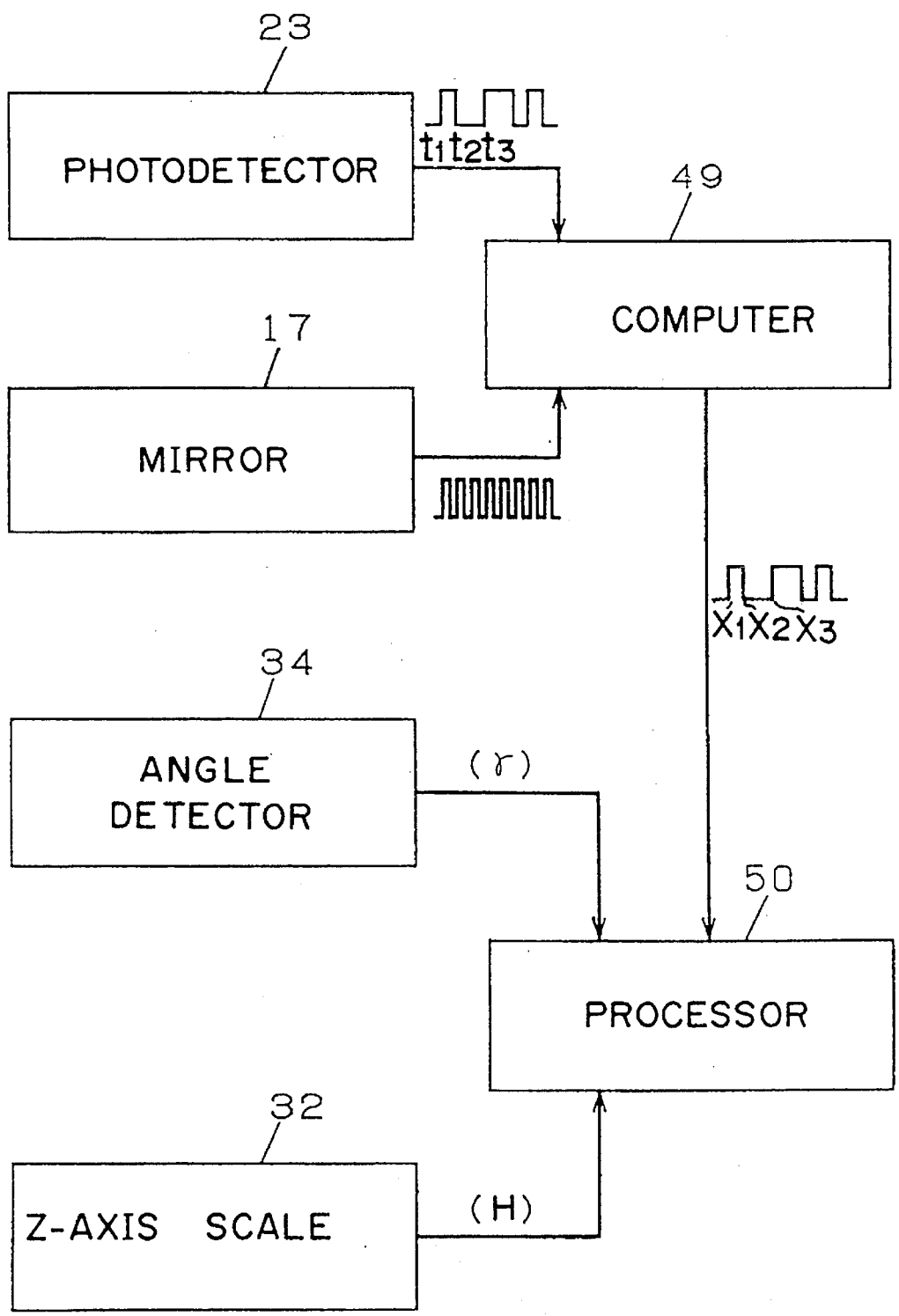
FIG. 13 is a schematic block diagram indicating the system construction of FIG. 12.
Figure 17:
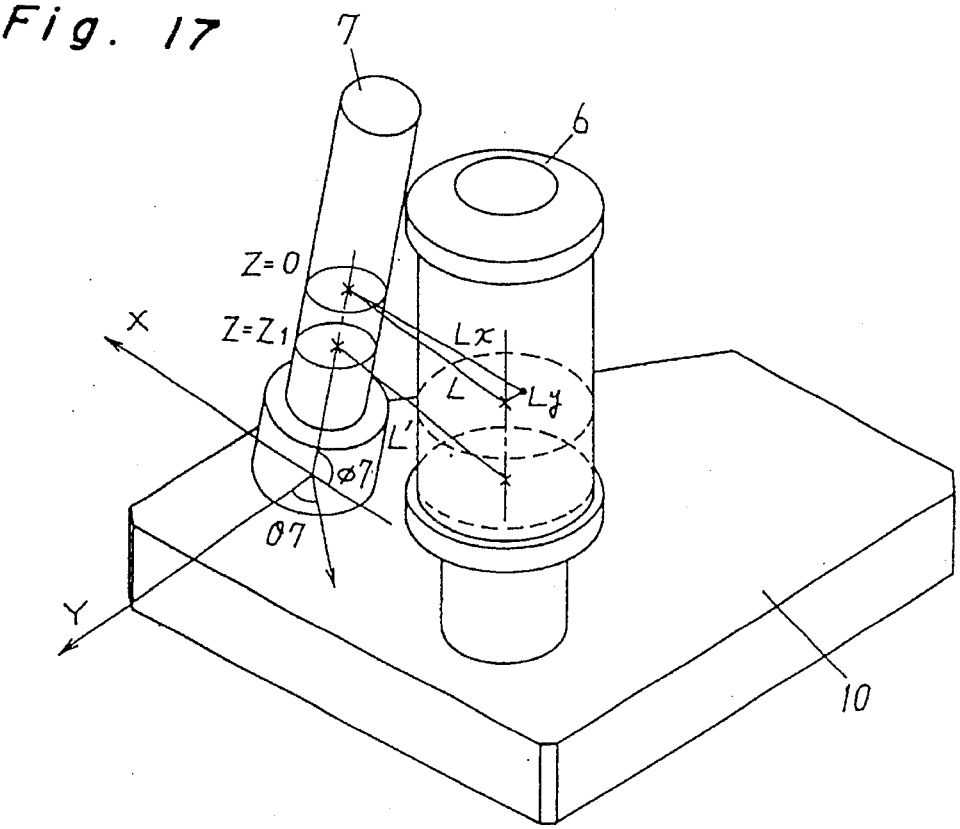
FIG. 17 is a view similar to FIG. 16, but indicating the relative positional relationship between the two posts.

As shown in FIG. 13, the computation processing device 50 computes the inclination angle ($\phi_7$), inclination direction ($\theta_7$) and center distance (L') at an arbitrary height as shown in FIG. 17, based on the length (H) of vertical movement, rotational angle ($\gamma$), and X-projected position coordinates (x1, x2, x3, . . . ).

Figure 18:
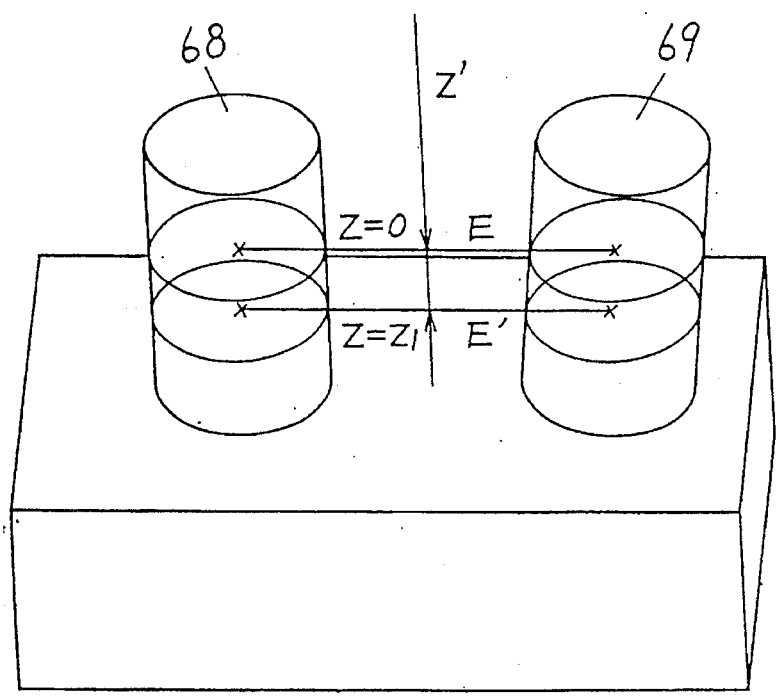
FIG. 18 is a perspective view of two reference posts for use in setting the reference height.

The position coordinate measurement device of FIG. 12 has two reference posts 68 and 69 as shown in FIG. 18 for the purpose of setting the light emitting and receiving optical systems 15 and 21 at the reference height (Z=0) of the mechanism. The center distance (E) at the reference height (Z=0) between the two reference posts 68 and 69 is already known. Here, the reference post 68 is set generally vertically against the installation plane 39, while the reference post 69 is slightly inclined. The two reference posts 68 and 69 have a diameter larger than that of the inclined posts 7 and 8 and that of the roller posts 6 and 9, and are spaced a larger distance from each other than the distance between the roller post 6 and inclined post 7 and that between the roller post 9 and inclined post 8. Therefore, measurements can be made adequately even with the conventional, contact-type position coordinate measurement device. The measurement object 70 in this preferred embodiment comprises the principal components 1 through 9 of the VTR mechanism and the reference posts 68 and 69.

The three-dimensional position coordinate measurement device configured as described above is discussed hereinafter, taking a measurement method for the upstream roller post 6, inclined post 7 and drum unit 5 as example.

Figure 14:
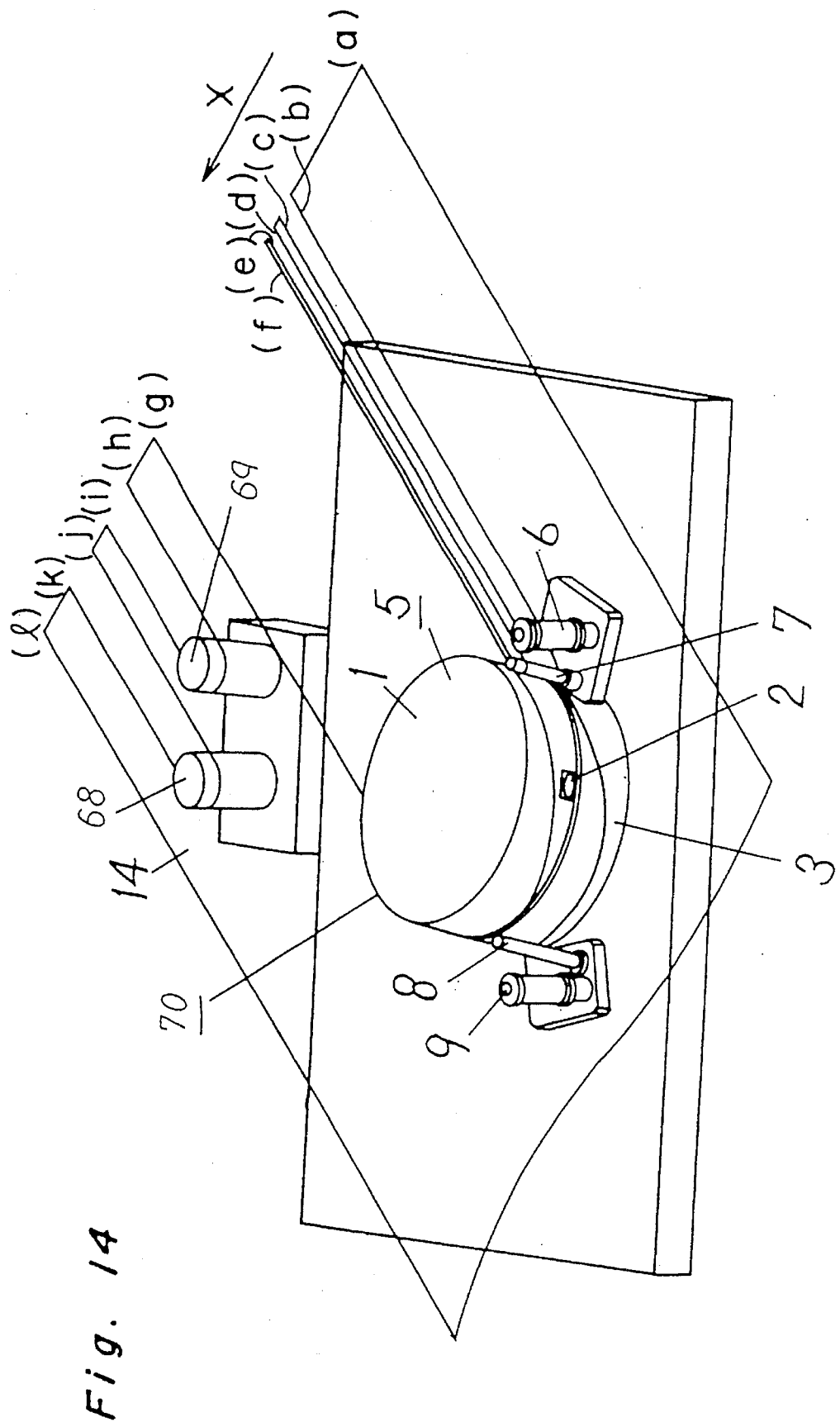
FIG. 14 is a perspective view of the object when measured by the device of FIG. 12.

As shown in FIG. 14, the measurement platform 38 is rotated by the rotary stage 33 for the measurement of the upstream roller post 6, inclined post 7 and drum unit 5. Since on the light receiving side the portions where the laser beam 14 is intercepted by the measurement object 70 become dark, and other portions not intercepted become bright, light boundaries (a) through (l) are generated in this order in the X-axis direction. Of these light boundaries (a) through (l), (b) and (c) indicate the boundaries for the roller post 6, while (d) and (e) indicate the boundaries for the inclined post 7.

Figure 15:
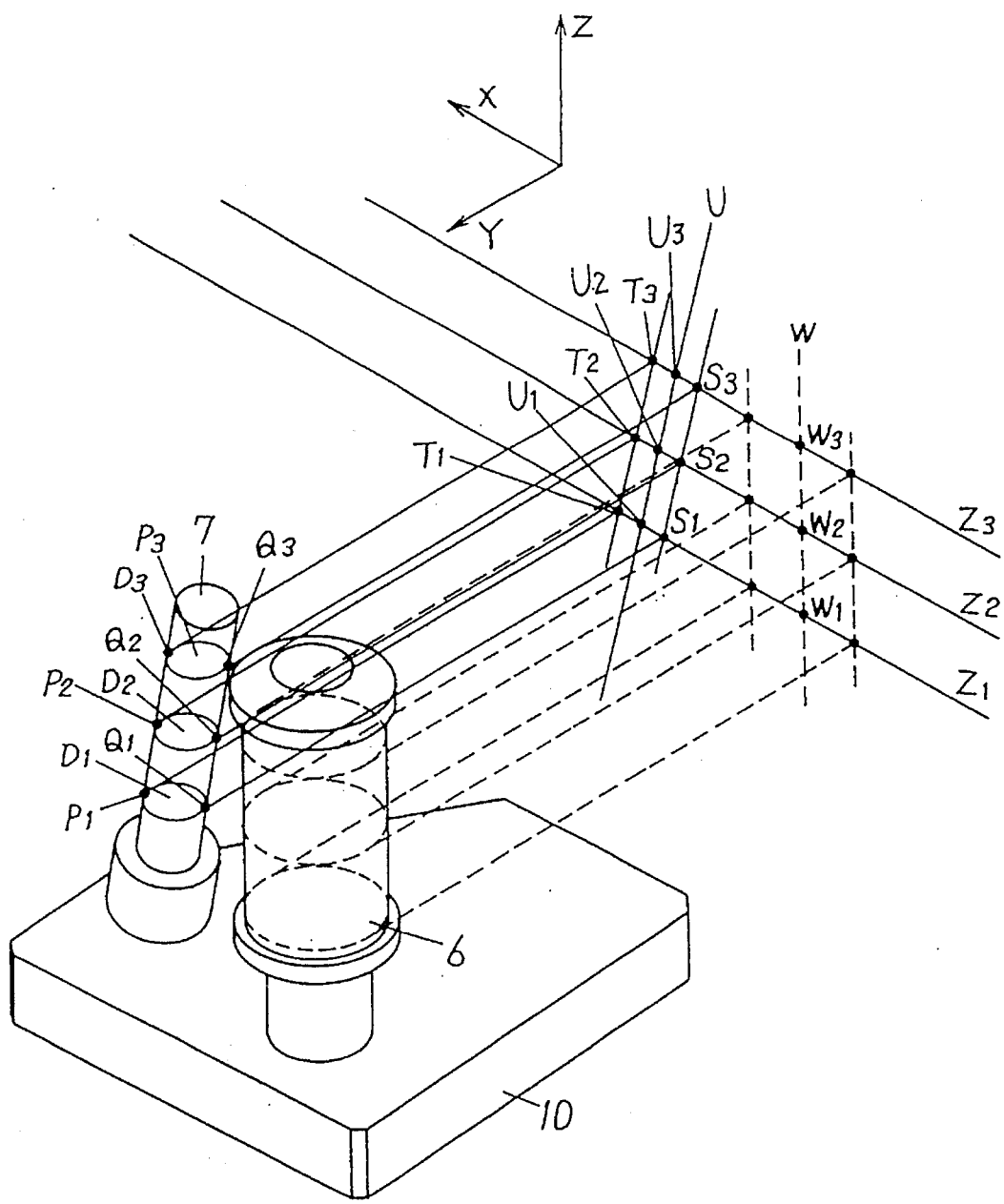
FIG. 15 is a perspective view of a roller post and an inclined post of the object of FIG. 14.
Figure 16:
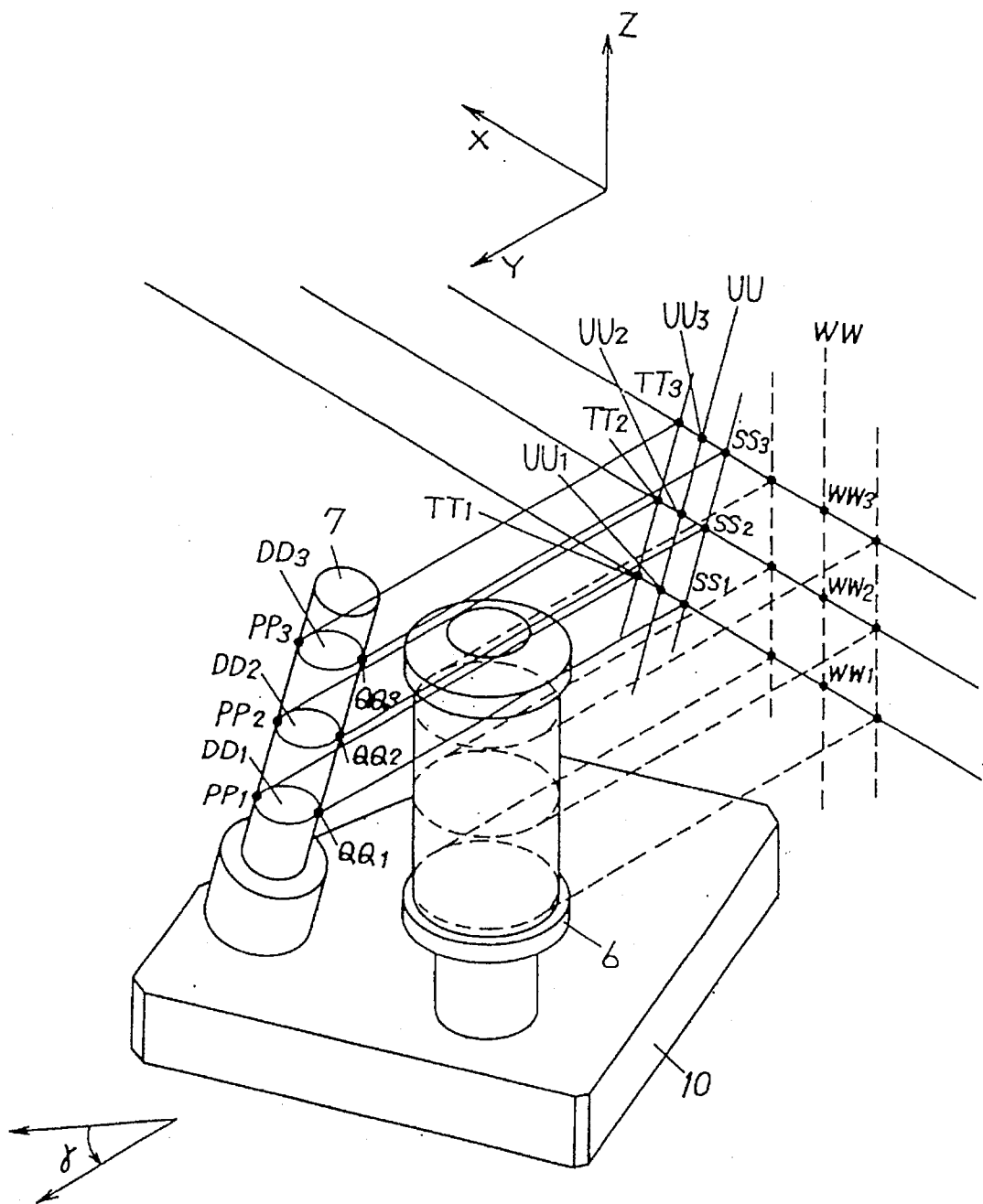
FIG. 16 is a view similar to FIG. 15, but indicating the two posts when the object of FIG. 14 is rotated.

More specifically, the laser beam 14 is irradiated at the height of (Z1) on the upstream roller post 6 and inclined post 7 as shown in FIG. 15. As for the inclined post 7, the first X-projected position coordinates (S1, T1), which are the light boundaries (d) and (e) in the X-axis direction as explained above, are determined from both tangent points P1 and Q1 of the cross-sectional circle D1 that is generated when the inclined post 7 is cut by the laser beam 14. Furthermore, the X-projected position coordinates (S1~3, T1~T3) of the first profile line are determined with the computation device 49 by moving the Z-axis stages 30 and 31 simultaneously in the Z direction to (Z1)~(Z3), sequentially. Next, in FIG. 16 in which the measurement platform 38 has been rotated by an angle of (γ) by means of the rotary stage 33 from the condition of FIG. 15, the laser beam 14 is irradiated on the inclined post 7 and roller post 6 from a direction that differs by the angle of (γ). Then, while moving the Z-axis stages 30 and 31 simultaneously downward in the Z-axis direction to (Z3)~(Z1) in sequence, the X-projected position coordinates (SS3~SS1, TT3~TT1) of the second profile line of the inclined post 7 are determined with the computation device 49 by irradiating the laser beam 14. Finally, from the X-projected position coordinates (S1~S3, T1~T3) of the first profile line and the X-projected position coordinates (SS1~SS3, TT1~TT3) of the second profile line, the X-projected position coordinates {U(U1~U3), UU(UU1~UU3)} of the center lines of the inclined post 7 as seen from the two directions, respectively, can be determined in approximation with the computation processing device 50. Hence in FIG. 17, the inclination angle ($\phi_7$) and inclination direction ($\theta_7$) of the upstream inclined post 7 can be determined using Formula 2 given by:

$$\phi_7 = \tan^{-1}\frac{Z3-Z1}{G7}, \quad \theta_7 = \sin^{-1}\frac{U3-U1}{G7}$$

where $$G7 = \sqrt{\left\{\frac{(UU3-UU1)-(U3-U1)\cos\gamma}{\sin\gamma}\right\}^2 + (U3-U1)^2}$$

Similarly, the inclination angle ($\phi$) and inclination direction ($\theta$) of the roller post 6 and drum unit 5 can also be determined at the same time. The center distance (L') between the roller post 6 and inclined post 7 at the height (Z1) can be determined using Formula 3 given by:

$$L' = \sqrt{Lx^2 + Ly^2}$$

where $Lx=U1-W1$ and $Ly=\{(U1-W1)-(UU1-WW1)/\cos\gamma\}/\tan\gamma$.

Furthermore, the center distance (Lα) at an arbitrary height (α) can be determined using Formula 4 given by:

$$L\alpha = \sqrt{(x_6-x_7)^2 + (y_6-y_7)^2}$$

where $$x_6 = -(W3-W1)\frac{\alpha-Z1}{Z3-Z1}$$

$$y_6 = -G6\cos\theta_6\frac{\alpha-Z1}{Z3-Z1}$$

$$x_7 = -(U3-U1)\frac{\alpha-Z1}{Z3-Z1} + Lx$$

$$y_7 = -G7\cos\theta_7\frac{\alpha-Z1}{Z3-Z1} + Ly$$

Next, in order to find the center distance (L) at the reference height (Z=0) which is the center of the design, the difference (Z') between the reference height (Z=0) and (Z1) is determined from the reference posts 68 and 69 that are measured at the same time as the roller post 6, inclined post 7 and drum unit 5. As mentioned previously, the center distance (E) between the two reference posts 68 and 69 at the reference height (Z=0) is known. Also, the center distance at (Z1) is (E') from the measurement with the laser beam 14. In other words, since the inclination angle ($\phi$) and inclination direction ($\theta$) of the reference posts 68 and 69 have already been calculated by the computation processing device 50, it is possible to find the difference (Z') between the height, at which the center distance becomes (E), and (Z1). Accordingly, by substituting the value of height ($\alpha=Z1+Z'$) in Formula 4, the computation processing device 50 can determine the center distance (L) at the reference height (Z=0) between the roller post 6 and inclined post 7. Also, the drum unit 5, downstream inclined post 8 and roller post 9 can be measured by rotating the measurement object until a profile line is detected.

As indicated above, according to this preferred embodiment, it is possible to measure three-dimensionally and without contact all of the inclination angles ($\phi$s) and inclination directions ($\theta$s) and center distances (Ls) at the reference height (Z=0), which is the center of the design, between the upstream roller post 6, inclined post 7, drum unit 5, downstream inclined post 8, and roller post 9.

Note that in this preferred embodiment, a description was given for the method of and device for finding the three-dimensional position coordinates from two sets of different projected position coordinates obtained by rotating the measurement object, but measurement can be made similarly by rotating the light emitting and receiving optical systems relative to the measurement object. Furthermore, although in this preferred embodiment description was given for the case in which the laser beam is irradiated from two different directions, it is also possible to measure from three or more directions since the three-dimensional position coordinates can be determined if at least two sets of different X-projected position coordinates can be obtained. In that event, the measurement accuracy will improve further.

Figure 19:
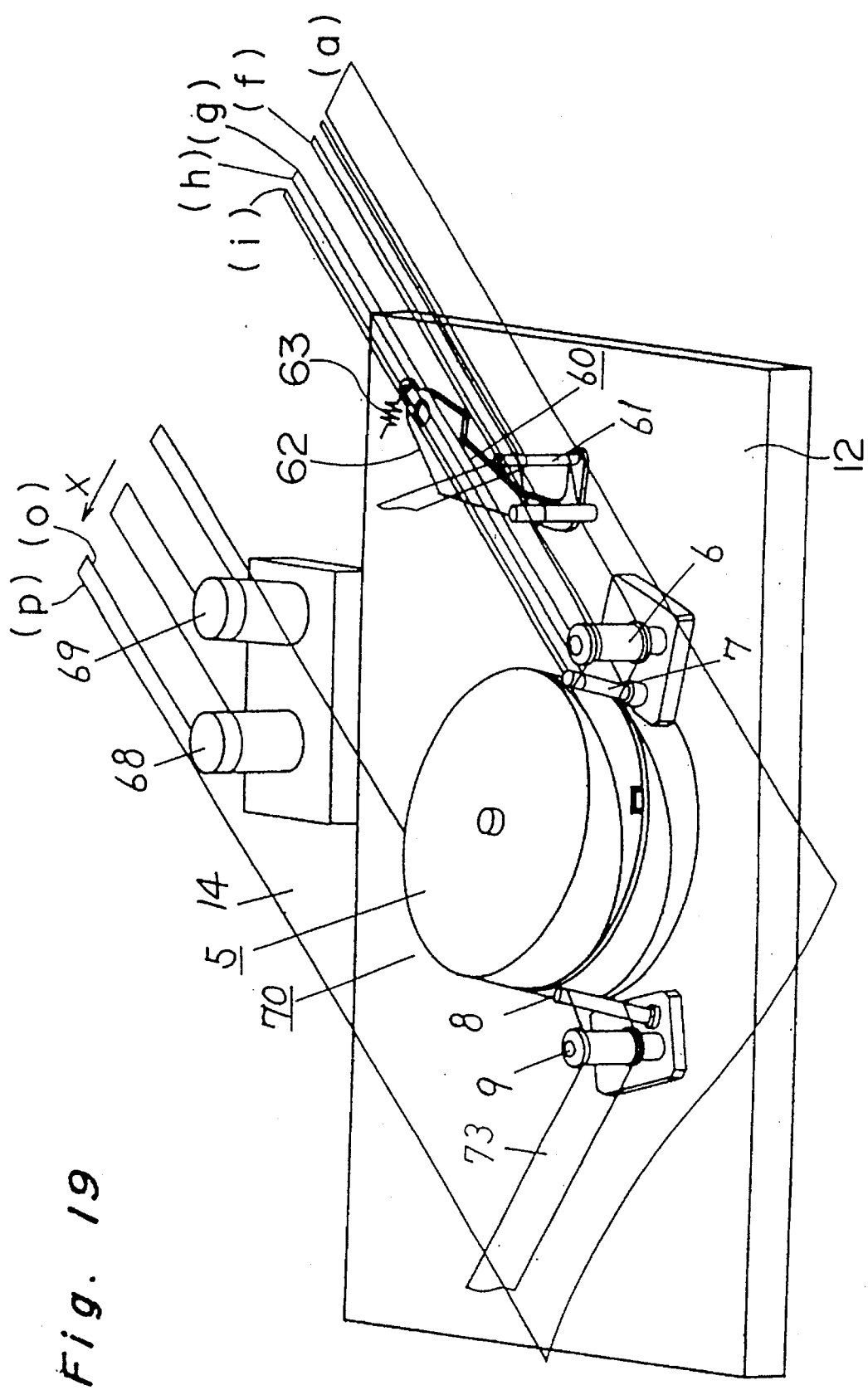
FIG. 19 is a perspective view of the object of FIG. 14 when measured by the position coordinate measurement device having a tension device.

As best shown in FIG. 19, a tension device 60 may be mounted on the chassis 12 to provide a tape 73 with a constant tension. The tension device 60 comprises a tension post 61 which makes contact with the tape 73, a base 62 for retaining the tension post 61, and a spring 63 having one end connected to the chassis 12 and the other end connected to the base 62. Thus, the measurement object 70 shown in FIG. 19 comprises the principal components 1 through 9 of the VTR mechanism, the tension device 60, and reference posts 68 and 69.

As described previously, the tape 73, wound around the measurement object 70 with a fixed angle, is a transparent tape such as, for example, a base film on which no magnetic substance is coated so that it transmits the laser beam 14 therethrough and has approximately the equivalent properties in terms of thickness and stiffness, with those of the magnetic tape for use in recording signals.

The three-dimensional position coordinate measurement device configured as described above is discussed hereinafter, taking a measurement method for the upstream roller post 6, inclined post 7 and drum unit 5 as example.

The tape 73 is first wound around individual components of the measurement object 70, and a constant tension is applied thereto by means of the tension device 60. Next, the measurement platform 38 is rotated by means of the rotary stage 33 so that the upstream roller post 6, inclined post 7 and drum unit 5 can be measured. Since on the light receiving side the portions where the laser beam 14 is intercepted by the measurement object 70 become dark, and other portions with no interception become bright, light boundaries (a) through (p) are generated in this order in the X-axis direction. Of these light boundaries (a) through (p), (f) and (g) indicate the boundaries for the roller post 6, while (h) and (i) indicate the boundaries for the inclined post 7. Since the tape 73 transmits the laser beam 14 therethrough, no boundary between brightness and darkness will appear due to the tape on the light receiving side.

Figure 20:
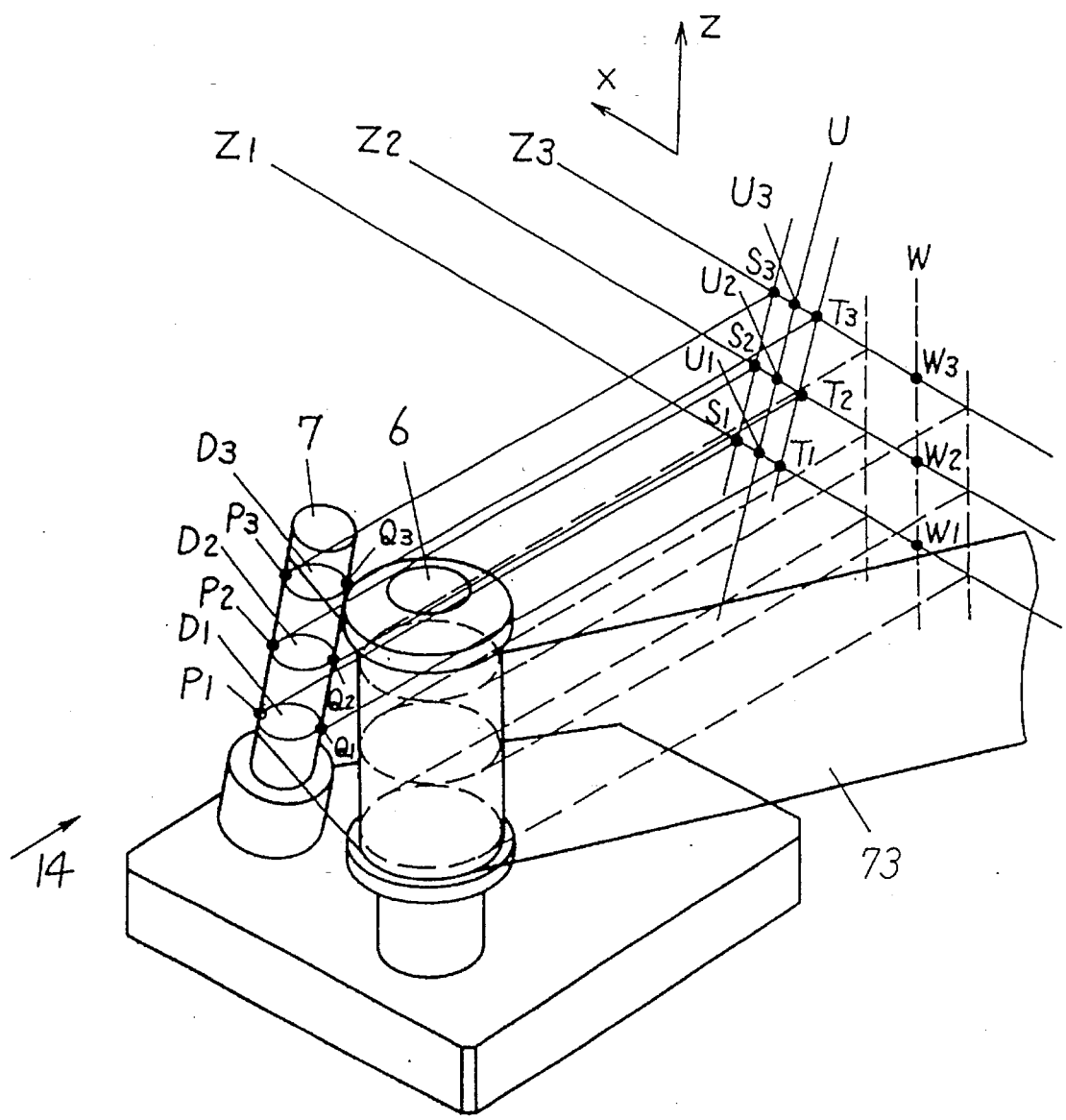
FIG. 20 is a view similar to FIG. 15, but indicating the two posts when a tension is applied thereto by the tension device through a transparent tape wound therearound.
Figure 21:
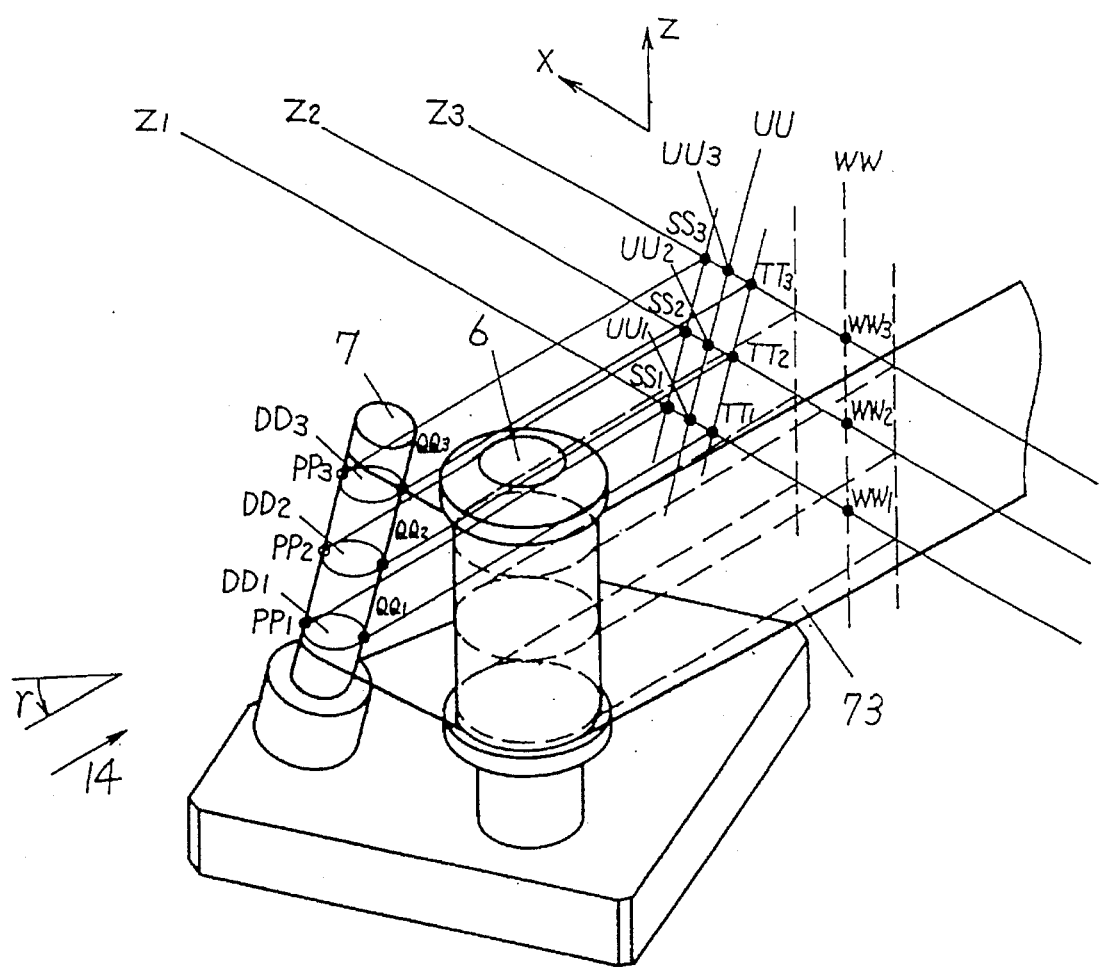
FIG. 21 is a view similar to FIG. 20, but indicating the two posts when the object is rotated.

More specifically, the laser beam 14 is irradiated at the height of (Z1) on the upstream roller post 6 and inclined post 7, as shown in FIG. 20. With respect to the roller post 6, the first X-projected position coordinates (S1, T1), which are the light boundaries (h) and (i) in the X-axis direction as explained above, are determined from both tangent points P1 and Q1 of the cross-sectional circle D1 which is generated when the inclined post 7 is cut by the laser beam 14. Furthermore, the Z-axis stages 30 and 31 are moved simultaneously in the Z direction to (Z2)~(Z3) in sequence, and the X-projected position coordinates {(S2, S3), (T2, T3)} of the first profile line are determined with the computation device 49. Next, in FIG. 21 in which the measurement platform 38 has been rotated by an angle of (γ) by means of the rotary stage 33 from the condition shown in FIG. 20, the laser beam 14 is irradiated on the inclined post 7 and roller post 6. Then, by irradiating the laser beam 14 while moving the Z stages 30 and 31 simultaneously downward in the Z direction to (Z3)~(Z1) in sequence, the X-projected position coordinates {(SS3~SS1), (TT3~TT1)} of the second profile lines of the inclined post 7 are determined with the computation device 49. Finally, from the X-projected position coordinates {(S1~S3), (T1~T3)} of the first profile lines and the X-projected position coordinates {(SS1~SS3), (TT1~TT3)} of the second profile lines, the X-projected position coordinates {U(U1~U3), UU(UU1~UU3)} of the center line of the inclined post 7 as seen from the two directions, respectively, are determined in approximation by means of the computation processing device 50. Accordingly, in FIG. 16, the inclination angle (φ7) and inclination direction (θ7) can be determined using the Formula 2 indicated previously.

Similarly, the inclination angle (φ) and inclination direction (θ) of the roller post 6, drum unit 5, tension post 61, etc., can also be determined. Further, the center distance (L') at the height of (Z1) between the roller post 6 and inclined post 7 can be determined using the Formula 3 indicated previously.

Also, the center distance (Lα) between the posts at an arbitrary height (α) can be determined with the Formula 4 indicated previously.

Moreover, the center distance (L) at the reference height (Z=0), which is the center of the design, can be determined with a method similar to that discussed above. Also, the drum unit 5, downstream inclined post 8, and roller post 9 can be measured, if rotated until a profile line can be detected.

Therefore, it becomes possible to measure all of the inclination angles (φs), inclination directions (φs), and the center distance (L) at the reference height (Z=0), which is the center of the design, of the upstream roller post 6, inclined post 7, drum unit 5, downstream inclined post 8, roller post 9, and tension post 61 three-dimensionally without contact and in a condition in which a force is added from the tape 73 having a constant tension.

Figure 22:
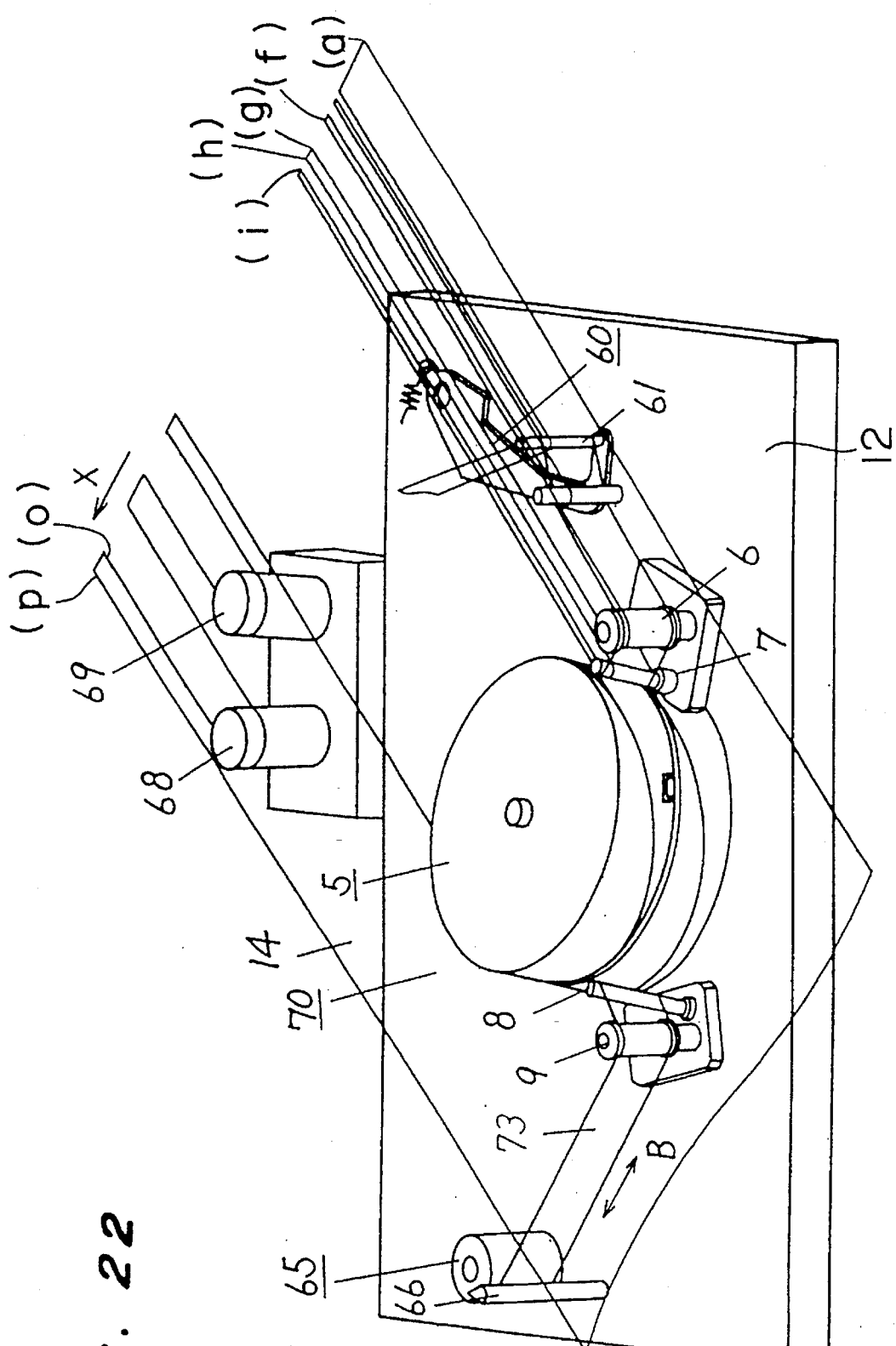
FIG. 22 is a perspective view of the object when measured by the position coordinate measurement device having a tension device and a tape drive.

As shown in FIG. 22, if the tape drive 65 comprising the post 66 and pinch roller 67 is mounted on the chassis 12, the tape 73 is driven by the tape drive 65 in the direction of the arrow B. The tape 73 runs in the direction of the arrow B in contact with the measurement object 70, and the tape tension increases as the tape 73 moves towards the downstream side in the direction of motion, adding larger force as well to the measurement object 70. The measurement object 70 shown in FIG. 22 comprises the principal components 1 through 9 of the VTR mechanism, tension device 60, tape drive 65, and reference posts 68 and 69.

With respect to the three-dimensional measurement device as configured above, its measurement method will be described.

The tape 73 is wound around the measurement object 70 and is provided with a constant tension by means of the tension device 60. Also, the tape 73 is run in the direction of the arrow B by means of the tape drive 65. Since the tape 73 transmits the laser beam 14 therethrough, no brightness/darkness boundary due to the tape will appear on the light receiving side. Since the measurement method is the same as that explained above, its description will be omitted.

According to this preferred embodiment, it is possible to measure three-dimensionally and without contact the inclination angles (φs), inclination directions (θs) and the center distances (Ls) at the reference height (Z=0), which is the center of the design, of the upstream roller post 6, inclined post 7, drum unit 5, downstream inclined post 8, roller post 9, and tension post 61. Moreover, measurement is possible in a condition in which the position-dependent force is exerted upon the measurement object 70 by the tape 73 which is running, i.e., in a condition unlimitedly close to the actual mode of recording or playback.

Figure 23:
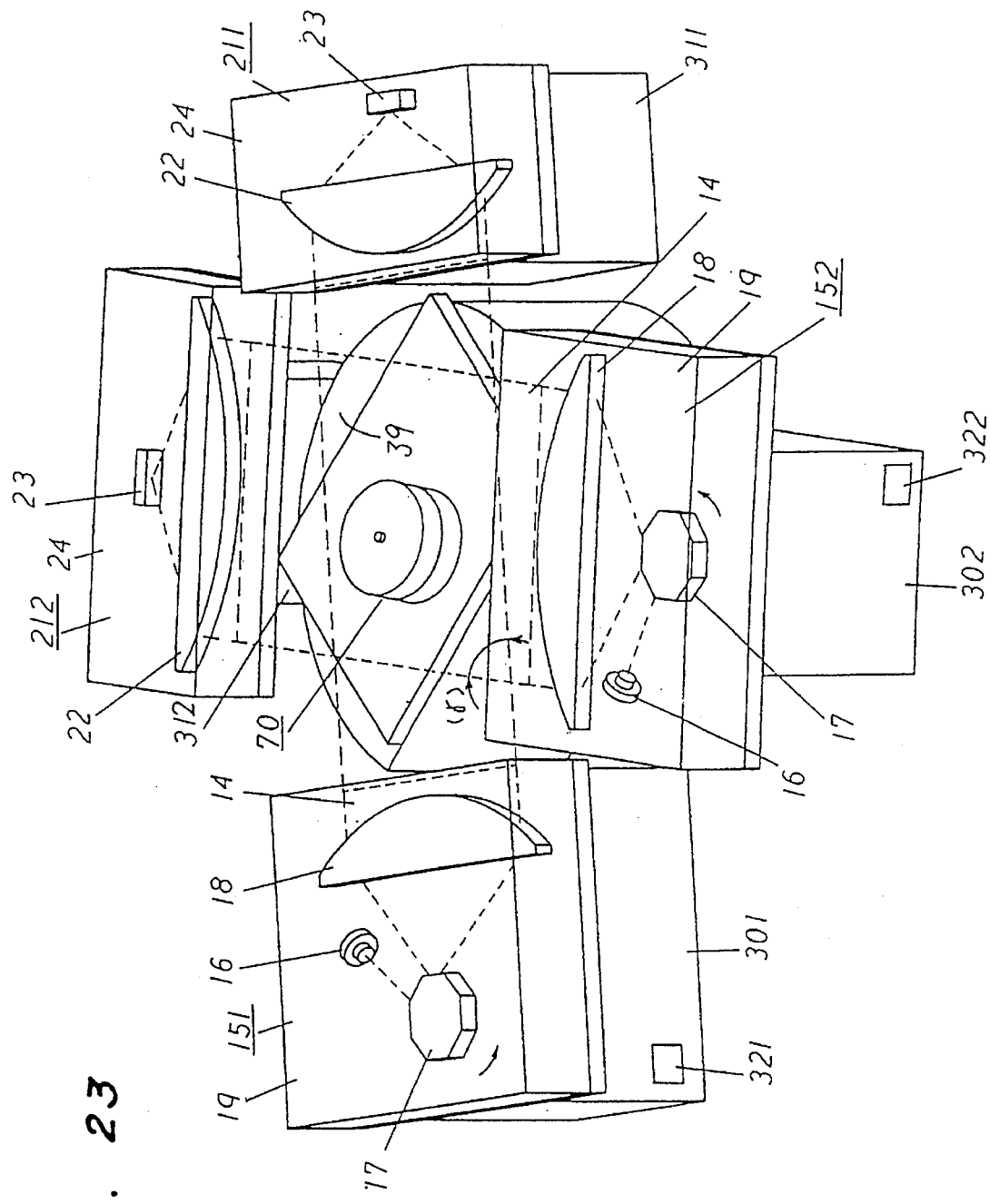
FIG. 23 is a perspective view of a position coordinate measurement device according to a fourth embodiment of the present invention.

FIG. 23 depicts a three-dimensional position coordinate measurement device according to a fourth embodiment of the present invention.

As shown in FIG. 23, the measurement object 70 is installed between a first light emitting optical system 151 and a first light receiving optical system 211. These optical systems 151 and 211 are mounted on respective Z-axis stages 301 and 311 for vertical movement thereof. The Z-axis stages 301 and 311 move the first light emitting and receiving optical systems 151 and 211, respectively, always by the same length in the Z-axis direction generally perpendicular to the installation plane 39. The length (H) of vertical movement of the first light emitting and receiving optical systems 151 and 211 is detected by means of a Z-axis scale 321 mounted on, for example, the Z-axis stage 301.

Moreover, a second optical system comprising a light emitting optical system 152 and a light receiving optical system 212 is installed at a position rotated by an angle of (γ) with respect to the first optical system. The second light emitting and receiving optical systems 152 and 212 are mounted on respective Z-axis stages 302 and 312 for vertical movement thereof. The Z-axis stages 302 and 312 move the second light emitting and receiving optical systems 152 and 212, respectively, always by the same length in the Z-axis direction generally perpendicular to the installation plane 39. The length (H) of vertical movement of the second light emitting and receiving optical systems 302 and 312 is detected by means of a Z-axis scale 322 mounted on, for example, the Z-axis stage 302.

The first and second light emitting optical systems 151 and 152 alternately emit respective laser beams.

As shown in FIG. 13, the computation processing device 50 computes the inclination angle (φ), inclination direction (θ) and center distance (L') at an arbitrary height as shown in FIG. 17, based on the angular difference (γ) in installation position of the first and second optical systems, instead of using the rotational angle (γ) detected by the rotational angle detection device 34, and the X-projected position coordinates (x1, x2, x3, . . . ) determined respectively by the first and second optical systems.

The measurement method by the three-dimensional position coordinate measurement device as configured above will be explained.

The first X-projected position coordinates are determined by emitting a laser beam on the measurement object 70 from the first light emitting optical system 151. Next, the second X-projected position coordinates are determined by emitting a laser beam from the second light emitting optical system 152. The remainder of the method of determining the three-dimensional position coordinates is the same as that explained above, so its description will be omitted.

According to this preferred embodiment, it is possible to measure three-dimensionally and without contact the inclination angles ($\phi$s), inclination directions ($\theta$s) and center distances (Ls) of all posts at the reference height (Z=0), which is the center of the design.

Although in the above-described embodiments the light emitting and receiving optical systems are moved vertically relative to the measurement object 70, the measurement object 70 may be moved vertically with the light emitting and receiving optical systems maintained stationary.

Although the number of posts is limited in the above-described embodiments, it is needless to say that other posts can also be measured in a similar manner. Moreover, since measurement can be made regardless of the amount of the inclination angle of the post, there will be no loss in measurement accuracy as the inclination angle increases, as was the case with the conventional contact-type position coordinate measurement systems. Furthermore, even with posts that are small in diameter and easily bend when a load is applied thereto, measurement can be made with good accuracy due to its non-contact nature.

Also, the measurement system of the present invention is smaller than the conventional contact-type position coordinate measurement systems, and hence it can be used for such application as inspection of assembly accuracy, which is generally performed in an assembly adjustment line of the VTR mechanisms.

Furthermore, in the above-described embodiments, a description has been given for the case of VTR mechanism's components being the measurement object, objects other than the foregoing can be measured as well.

Also, although two reference posts are used to set the reference height, other methods such as measuring a magnetic head may be used to establish its height.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A position coordinate measurement method comprising the steps of:

placing a plurality of objects to be measured on a plane;

irradiating a laser beam on said plurality of objects from a plurality of different directions, said laser beam having a predetermined diameter and scanning parallel to said plane;

computing a plurality of different projected position coordinates of each said plurality of objects from two tangent points of a cross section which is generated when said object is cut with said laser beam; and computing two-dimensional position coordinates of said plurality of objects from said different projected position coordinates and an angular difference between said different directions, and computing relative distances between each of said plurality of objects.

2. A position coordinate measurement device comprising:

a plane on which a plurality of objects to be measured is placed;

a light emitting optical system for emitting a laser beam having a predetermined diameter and scanning parallel to said plane;

a light receiving optical system having a photodetector for detecting said laser beam;

rotating means for rotating one of said plurality of objects and said light emitting and receiving optical systems relative to each other to thereby change an angle by which said laser beam is irradiated on said plurality of objects;

rotational angle detection means for detecting the angle of rotation of said one of said plurality of objects and said light emitting and receiving optical systems;

computation means for determining a plurality of different projected position coordinates of said plurality of objects from outputs of said photodetector by irradiating said laser beam from a plurality of different directions; and computation processing means for determining two-dimensional position coordinates of said plurality of objects, and relative distances between each of said plurality of objects, from said different projection position coordinates of said objects and said angle of rotation.

3. The position coordinate measurement device according to claim 2, further comprising a tape which is brought into contact with said plurality of objects and allows said laser beam to transmit therethrough, and tension means for applying a tension to said tape, wherein said computation processing means determines the two-dimensional position coordinates of said plurality of objects with which said tape having said tension is in contact.

4. The position coordinate measurement device according to claim 3, further comprising tape drive means for moving said tape relative to said plurality of objects, wherein said computation processing means determines the two-dimensional position coordinates of said plurality of objects with tape in motion.

5. A position coordinate measurement device comprising:

a plane on which a plurality of objects to be measured is placed;

plural sets of a light emitting optical system, for emitting a laser beam having a predetermined diameter and scanning parallel to said plane, and a light receiving optical system having a photodetector for detecting said laser beam, said light emitting optical system and said light receiving optical system being disposed on opposite sides of said objects, said plural sets being spaced a predetermined angle from each other;

computation means for determining a plurality of different projected position coordinates of said plurality of objects from outputs of said photodetector of each of said plural sets of light emitting optical system and light receiving optical system by irradiating said laser beam from a plurality of different directions; and a computation processing means for determining two-dimensional position coordinates of said plurality of objects, and distances between said plurality of objects, from said different projected position coordinates of said plurality of objects and an angular difference in the position of said plural sets of light emitting and receiving optical systems.

6. A position coordinate measurement method comprising the steps of:

placing a plurality of objects to be measured on a plane;

irradiating a laser beam on said plurality of objects from a plurality of different directions while said laser beam is being moved in a direction generally perpendicular to said plane, said laser beam having a predetermined diameter and scanning parallel to said plane;

computing a plurality of different projected position coordinates of said plurality of objects from two tangent points of a cross section which is generated when said plurality of objects is cut with said laser beam; and computing three-dimensional position coordinates of said plurality of objects, and distances between said plurality of objects, from said different projected position coordinates, the angular difference between said different directions, and the length of movement of said laser beam.

7. A position coordinate measurement device comprising:

a plane on which a plurality of objects to be measured is placed;

a light emitting optical system for emitting a laser beam having a predetermined diameter and scanning parallel to said plane;

a light receiving optical system having a photodetector for detecting said laser beam;

drive means for moving one of, said plurality of objects and said light emitting and receiving optical systems relative to each other so that said plurality of objects is irradiated with said laser beam at a plurality of heights;

movement detection means for detecting the length of movement of, said one of said plurality of objects and said light emitting and receiving optical systems;

rotating means for rotating said one of said plurality of objects and said light emitting and receiving optical systems relative to each other to thereby change an angle by which said laser beam is irradiated on said plurality of objects;

rotational angle detection means for detecting the angle of rotation of said one of said plurality of objects and said light emitting and receiving optical systems;

computation means for determining a plurality of different projected position coordinates of said plurality of objects from outputs of said photodetector by irradiating said laser beam from a plurality of different directions; and computation processing means for determining three-dimensional position coordinates of said plurality of objects, and distances between said plurality of objects, from said different projection position coordinates of said plurality of objects, said angle of rotation, and said length of movement.

8. The position coordinate measurement device according to claim 7, further comprising a tape which is brought into contact with said plurality of objects and allows said laser beam to transmit therethrough, and tension means for applying a tension to said tape, wherein said computation processing means determines the three-dimensional position coordinates of said plurality of objects, and said distance between said plurality of objects, with which said tape having said tension is in contact.

9. The position coordinate measurement device according to claim 8, further comprising tape drive means for moving said tape relative to said plurality of objects, wherein said computation processing means determines the three-dimensional position coordinates of said plurality of objects with said tape in motion.

10. A position coordinate measurement device comprising:

a plane on which a plurality of objects to be measured is placed;

plural sets of a light emitting optical system for emitting a laser beam having a predetermined diameter and scanning parallel to said plane and a light receiving optical system having a photodetector for detecting said laser beam, said light emitting optical system and said light receiving optical system being disposed on opposite sides of said plurality of objects, said plural sets being spaced a predetermined angle from each other;

drive means for moving one of, said plurality of objects and said plural sets of light emitting and receiving optical systems relative to each other so that said plurality of objects is irradiated with said laser beam of each of said plural sets at a plurality of heights;

movement detection means for detecting the length of movement of said one of, said plurality of objects and said plural sets of light emitting and receiving optical systems relative to each other so that said plurality of objects is irradiated with said laser beam at a plurality of heights;

movement detection means for detecting the length of movement of said one of said plurality of objects and said plurality sets of light emitting and receiving optical systems;

computation means for determining a plurality of different projected position coordinates of said plurality of objects from outputs of photodetectors of said plural sets of light emitting and receiving optical systems by irradiating said laser beam from plurality of different directions; and computation processing means from determining three-dimensional position coordinates of said plurality of objects, and distances between said plurality of objects, from said different projection position coordinates of said plurality of objects, an angular difference in the position of said plural sets of light emitting and receiving optical systems, and said length of movement.

* * * * *

UNITED STATES PATENT AND TRADEMARK OFFICE
CERTIFICATE OF CORRECTION

PATENT NO. : 5,481,361
DATED : January 2, 1996
INVENTOR(S) : Naoto YUMIKI et al.

It is certified that error appears in the above-indentified patent and that said Letters Patent is hereby corrected as shown below:

At column 13, line 50 change "(∅s)" to ---(⊖s)---.

At column 15, line 59 insert ---of--- before "said".

At column 16, line 40 insert ---said--- before "tape".

Signed and Sealed this

Seventeenth Day of September, 1996

BRUCE LEHMAN

Attest:

Attesting Officer    Commissioner of Patents and Trademarks

UNITED STATES PATENT AND TRADEMARK OFFICE
CERTIFICATE OF CORRECTION

PATENT NO. : 5,481,361
DATED : January 2, 1996
INVENTOR(S) : N. YUMIKI et al.

It is certified that error appears in the above-indentified patent and that said Letters Patent is hereby corrected as shown below:

On the cover, in section [30], "Foreign Application Priority Data", line 2, change "July 3, 1993" to ---July 30, 1993---.

Signed and Sealed this

Thirteenth Day of May, 1997

*Attest:*

BRUCE LEHMAN

*Attesting Officer*     *Commissioner of Patents and Trademarks*